(12) United States Patent
Pollock et al.

(10) Patent No.: US 7,429,840 B2
(45) Date of Patent: Sep. 30, 2008

(54) CONTROL OF AN ELECTRICAL RELUCTANCE MACHINE

(75) Inventors: Charles Pollock, Rutland (GB); Helen Geraldine Phyllis Pollock, Rutland (GB)

(73) Assignees: Black & Decker Inc., Newark, DE (US); University of Leicester, Leicester (GB)

( * ) Notice: Subject to any disclaimer, the term of this patent is extended or adjusted under 35 U.S.C. 154(b) by 107 days.

(21) Appl. No.: 10/526,986

(22) PCT Filed: Sep. 12, 2003

(86) PCT No.: PCT/GB03/03973

§ 371 (c)(1),
(2), (4) Date: Mar. 16, 2006

(87) PCT Pub. No.: WO2004/025822

PCT Pub. Date: Mar. 25, 2004

(65) Prior Publication Data

US 2006/0197396 A1 Sep. 7, 2006

(30) Foreign Application Priority Data

Sep. 12, 2002 (GB) ................................ 0221117.5

(51) Int. Cl.
*H02K 21/00* (2006.01)

(52) U.S. Cl. ...................... 318/254; 318/138; 318/700; 318/701; 318/432; 310/168

(58) Field of Classification Search ........................ None
See application file for complete search history.

(56) References Cited

U.S. PATENT DOCUMENTS 4,031,440 A * 6/1977 Christian et al. ............ 318/432

(Continued)

*Primary Examiner*—Lincoln Donovan
*Assistant Examiner*—Renata McCloud
(74) *Attorney, Agent, or Firm*—Michael P. Leary; Adan Ayala

(57) ABSTRACT

An electrical machine having stator (30) and rotor (31) is disclosed. The motor has field windings (F) and armature windings (A) energized by a suitable power electronic controller (401). A controller (400) sends signals to the power electronic controller (401) to control the armature current to control operation of the machine. When the machine is operating as a motor, the armature windings (A) will be supplied with electrical current from the power electronic controller by the application of applied voltage in synchronism with the rotation of the rotor (31). A mutually induced first electrical signal dependent on rotational position of the rotor will be induced within the field windings (F). This will create a superimposed gradient in the field current delivered by the power electronic controller (401). The mutually induced first electrical signal can be extracted from the field current by block (402) which may be a differentiator circuit or may be a coil coupled to the magnetic field around the field current conductor. A signal conditioning circuit (403) is provided which may contain a filter circuit. Block (404) creates a reference voltage for the comparator (405). The reference voltage can be zero such that the comparator (405) determines the polarity of the mutually induced first electrical signal. The output from the comparator is a digital signal indicating if the mutually induced first electrical signal is less than or greater than the threshold applied by block (404). This comparator output, a second electrical signal, represents the rotational position of the rotor relative to the stator and is supplied to the controller (400) to maintain synchronism between the armature excitation and the rotor position.

40 Claims, 28 Drawing Sheets

U.S. PATENT DOCUMENTS

| | | | | |
|---|---|---|---|---|
| 4,670,696 A | * | 6/1987 | Byrne et al. | 318/701 |
| 5,015,939 A | * | 5/1991 | Konecny | 318/701 |
| 6,107,763 A | * | 8/2000 | Rossi | 318/254 |
| 6,140,729 A | * | 10/2000 | Pollock et al. | 310/166 |
| 6,528,967 B2 | * | 3/2003 | Hallidy | 318/808 |
| 6,538,403 B2 | | 3/2003 | Gorti et al. | |
| 6,541,936 B2 | * | 4/2003 | Viti | 318/727 |
| 6,788,020 B1 | | 9/2004 | Pollock et al. | |
| 6,850,029 B1 | | 2/2005 | Pollock et al. | |
| 6,867,561 B1 | | 3/2005 | Pollock et al. | |
| 7,170,261 B2 | | 1/2007 | Walter et al. | |

* cited by examiner

Transition from pwm mode to single pulse mode

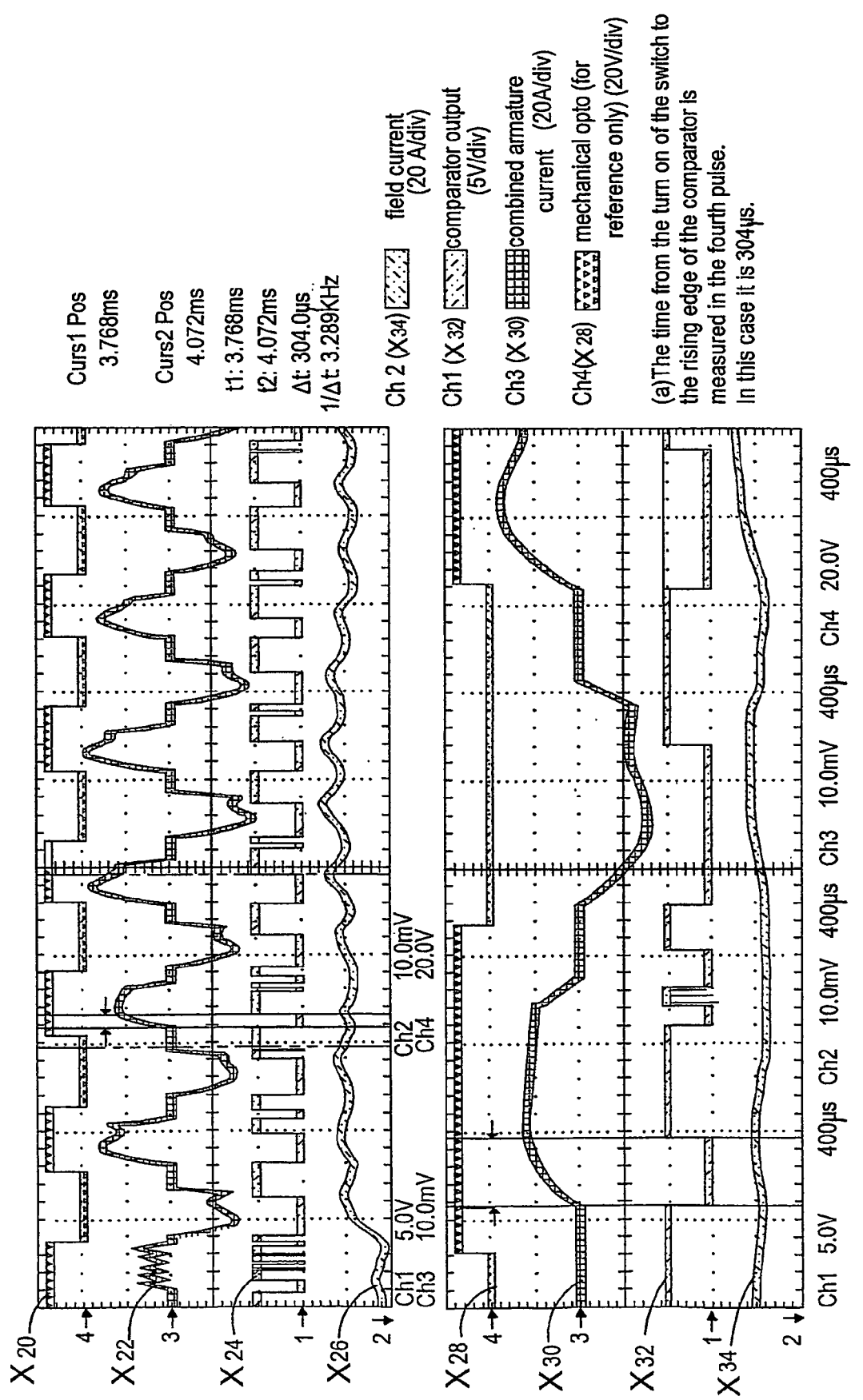
FIG. 17a Adaptive pulse positioning between the fourth and fifth-driven pulses

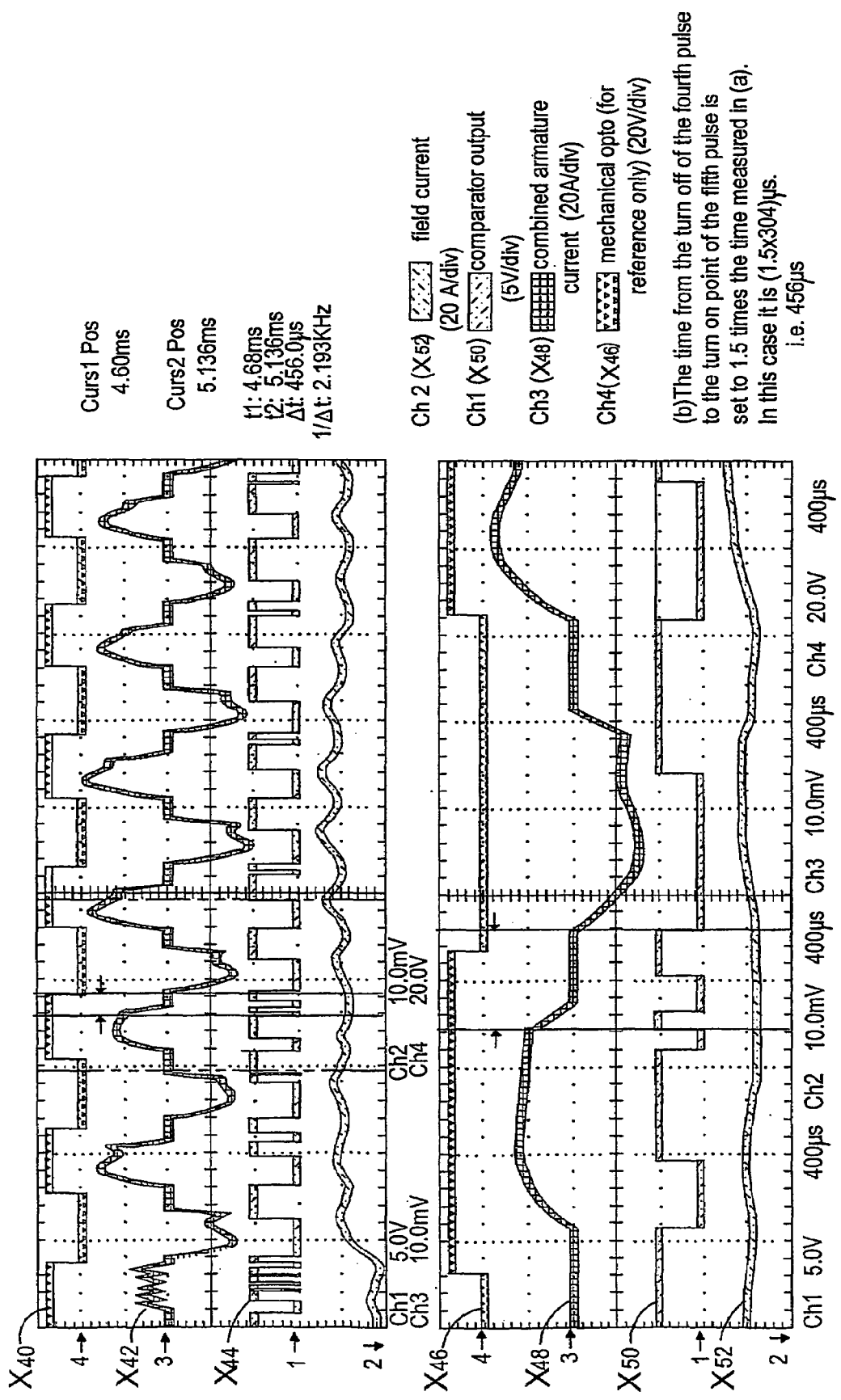
FIG. 17b Adaptive pulse positioning between the fourth and fifth driven pulses

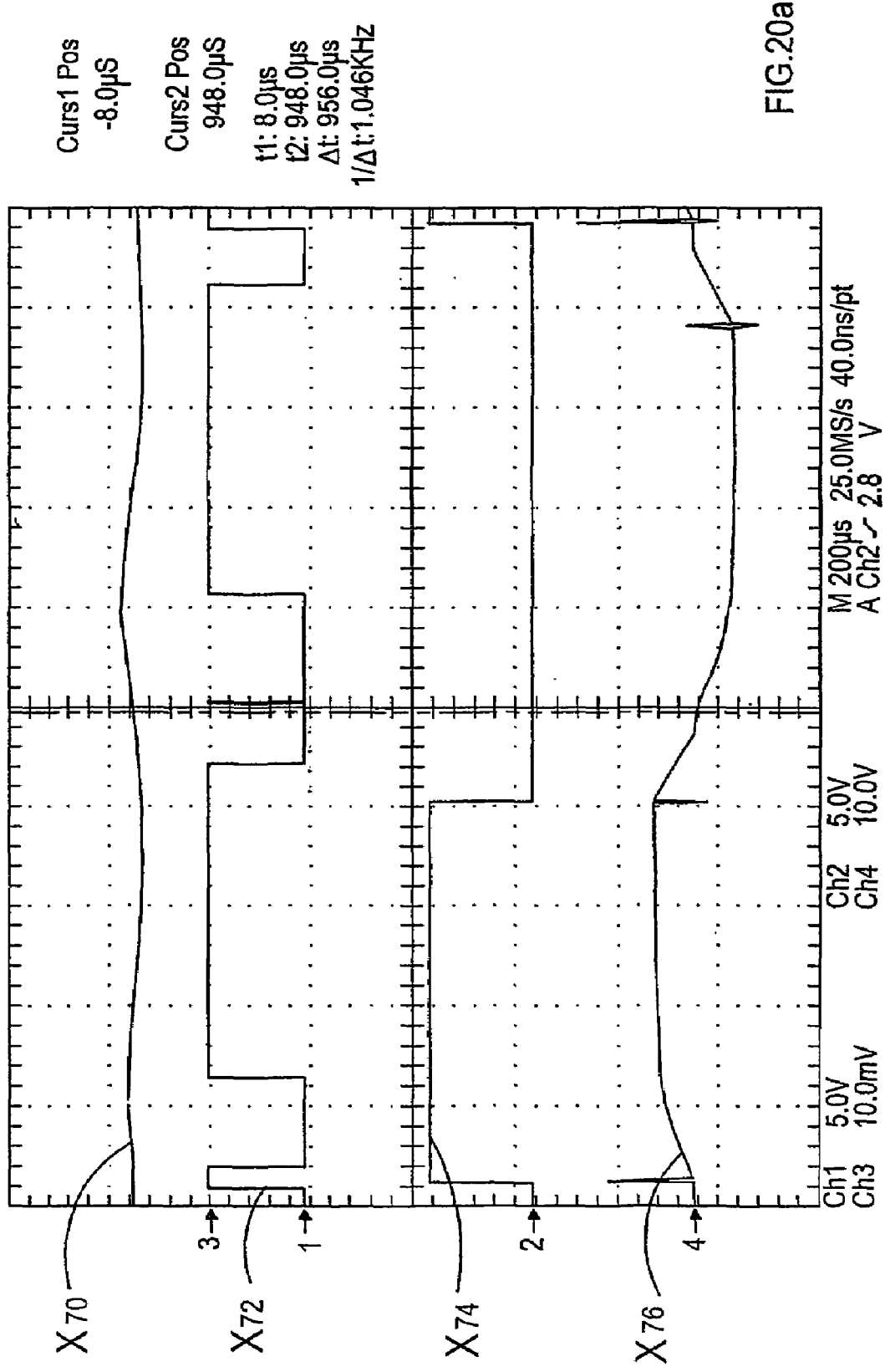

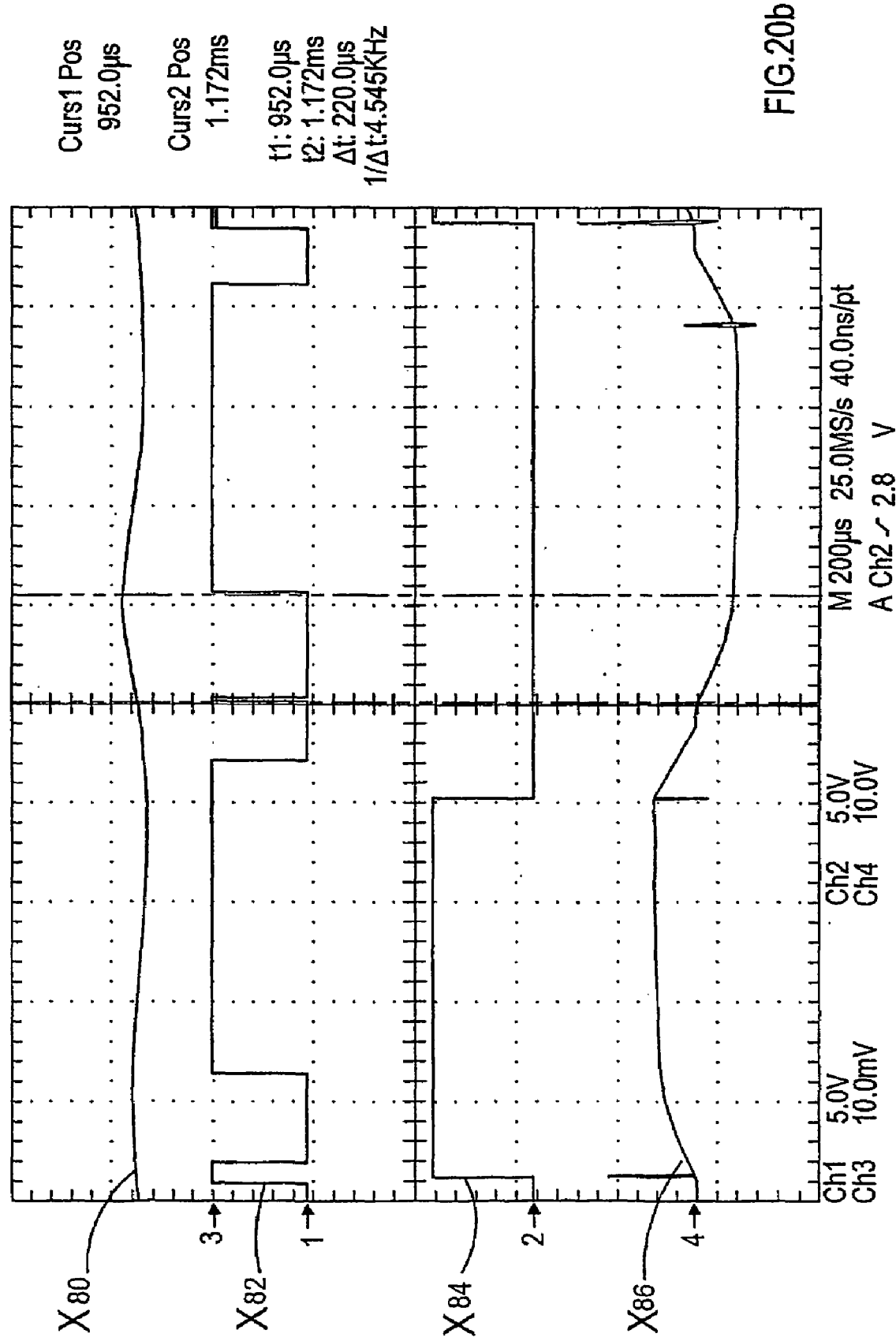

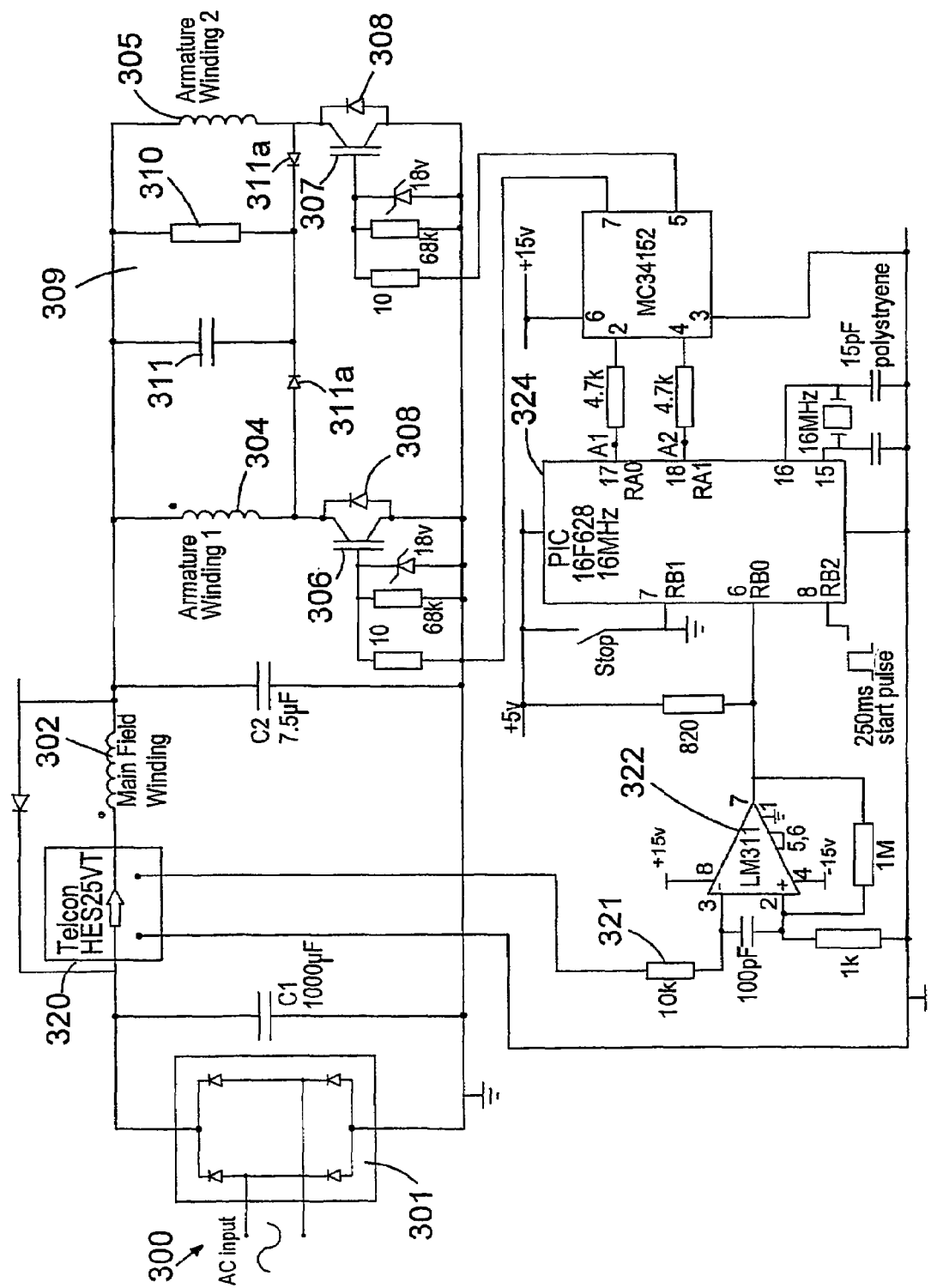
FIG.21 Sensorless Flux Switching Motor Control Circuit used in Load Tests

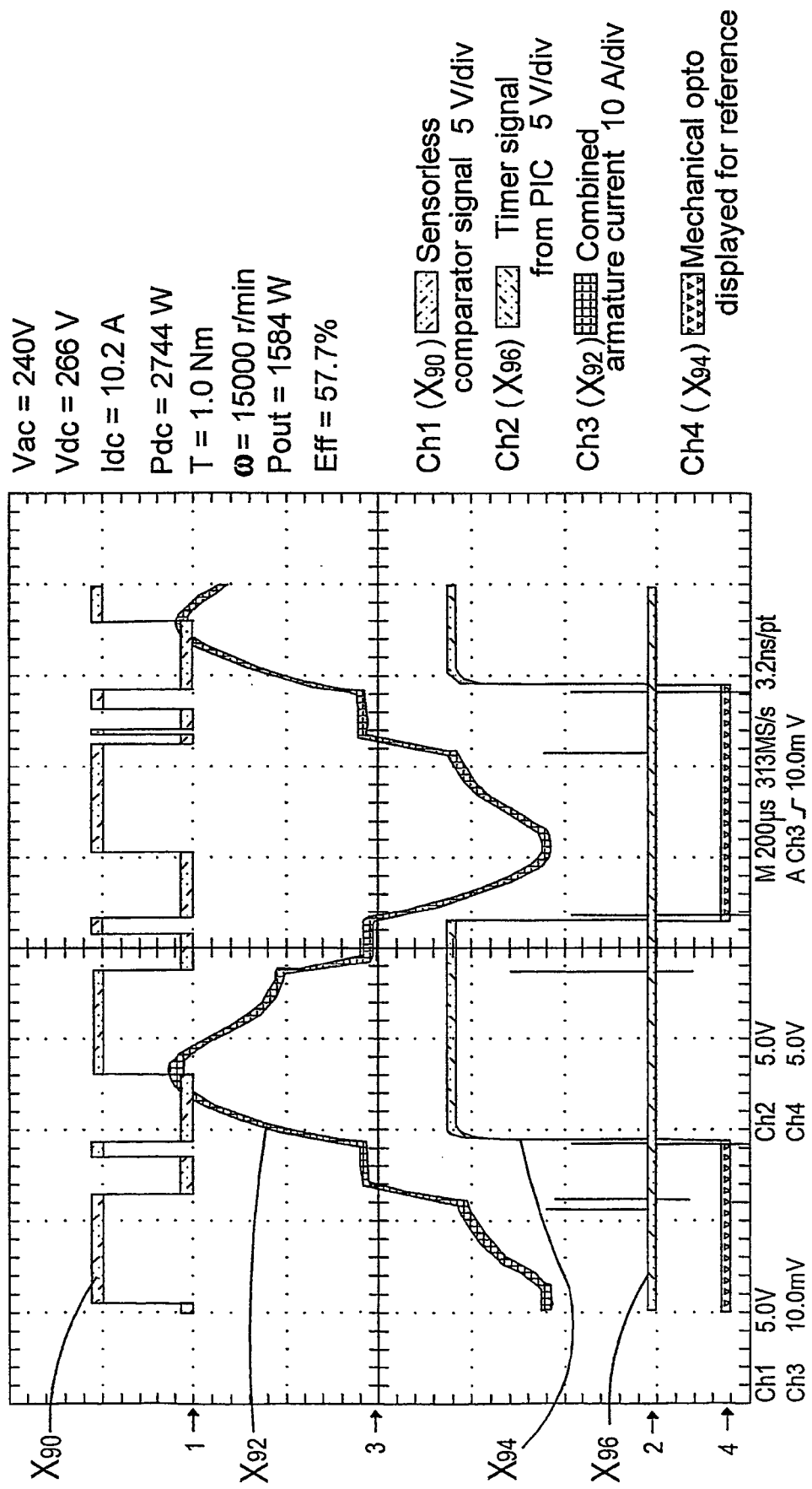
FIG.22 (part i)

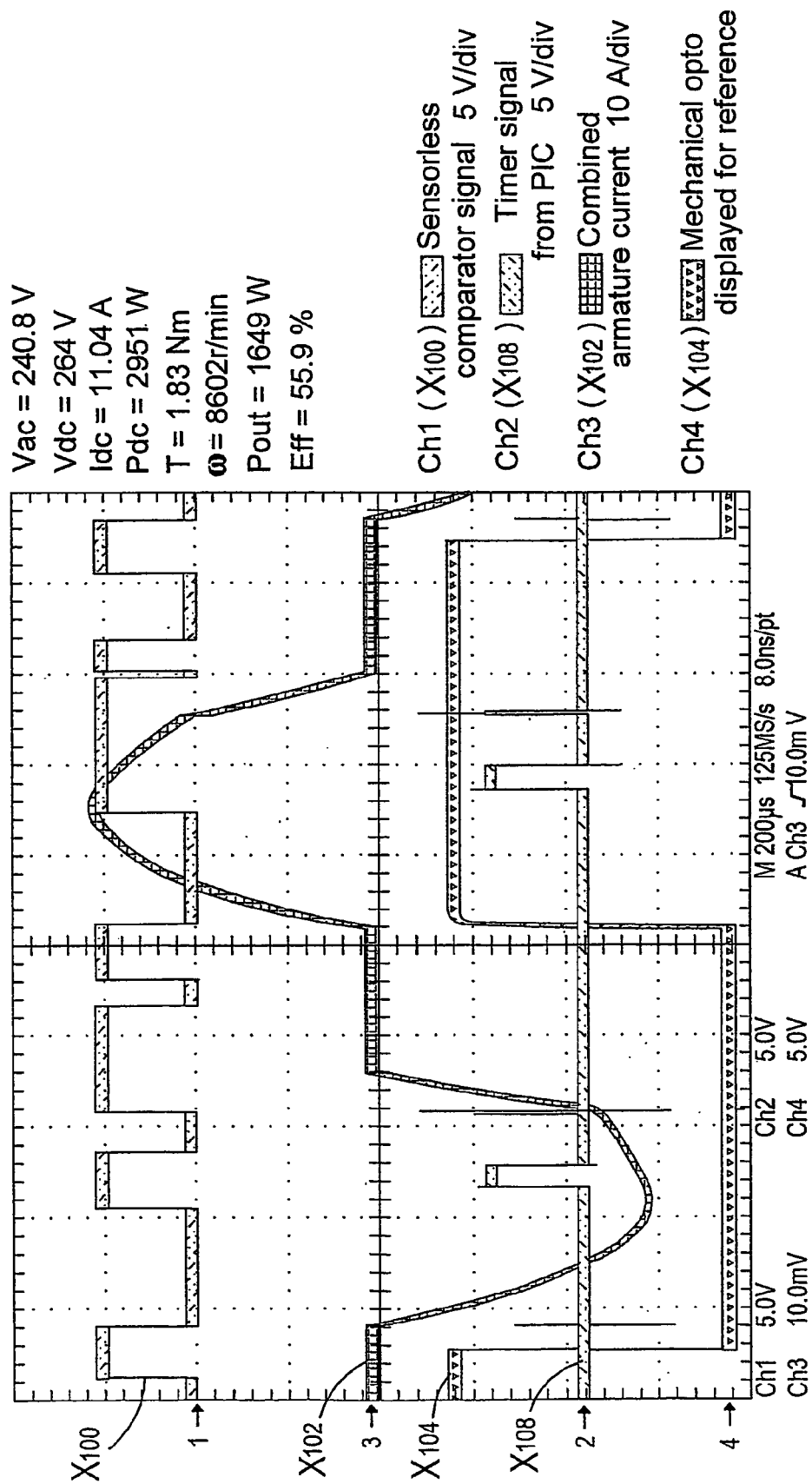
FIG.22 (part ii) Results at 1.0 Nm and 1.8 Nm operating from 240 V ac. Constant output power is maintained between these two points.

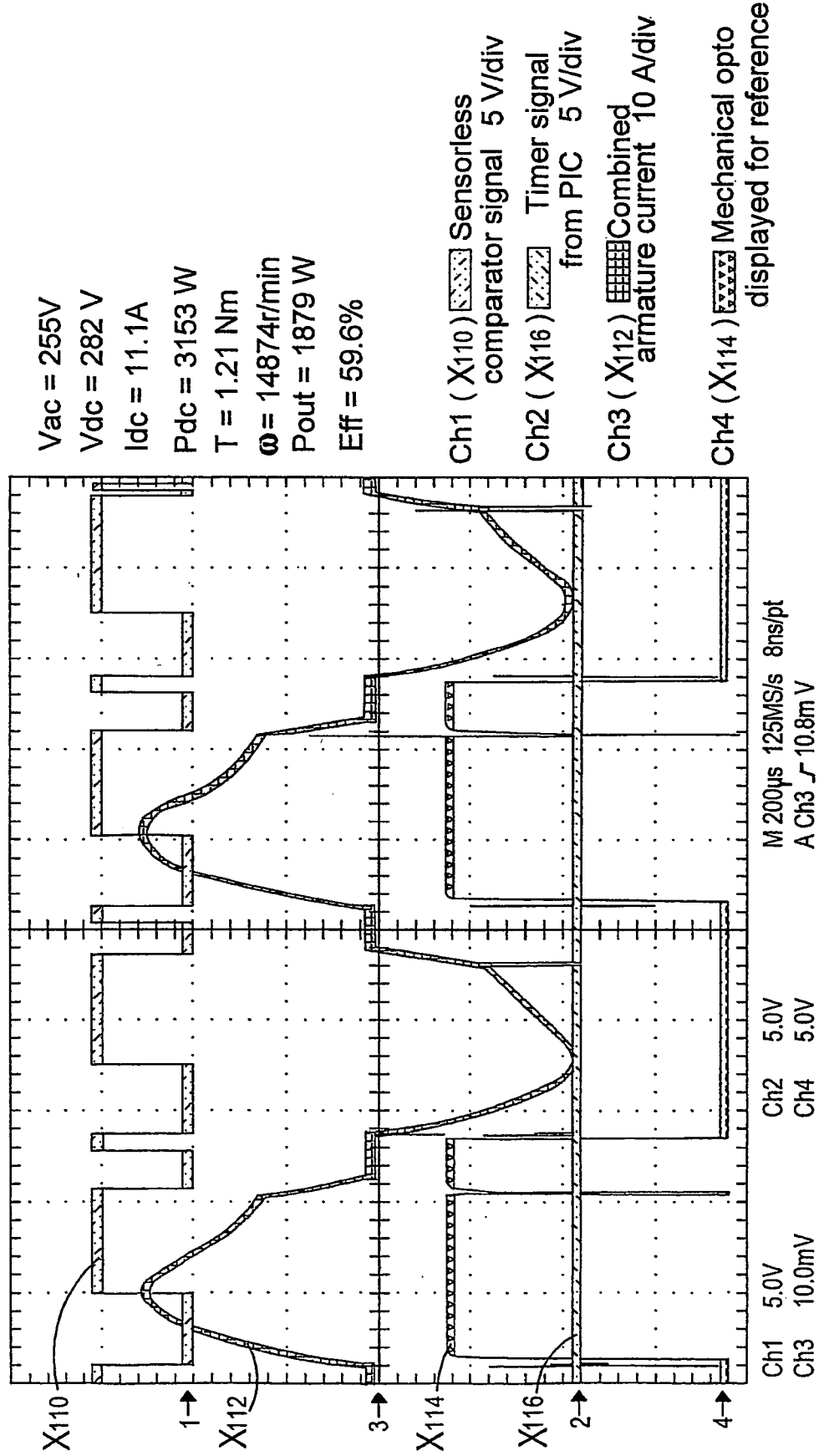
FIG.23 (part i) Results at 1.2 Nm and 1.93 Nm operating from 280 V dc (255 V ac) Constant output power of around 1860 W is maintained between these two points.

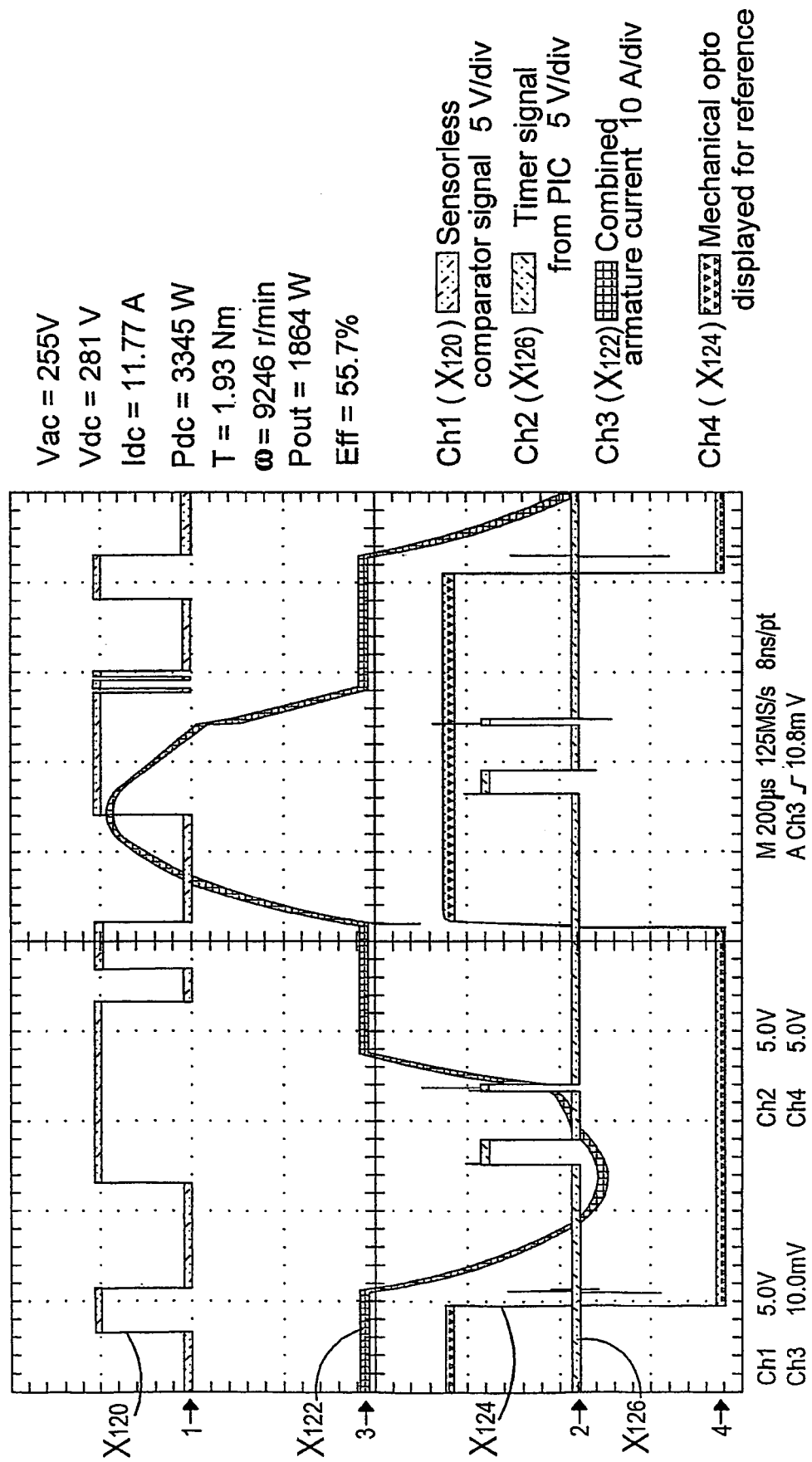
FIG.23 (part ii)

CONTROL OF AN ELECTRICAL RELUCTANCE MACHINE

This invention relates to control of electrical machines, and is concerned more particularly, but not exclusively, with control of electric machines without a mechanical shaft position sensor.

FIGS. 1a and 1b show a conventional two-phase switched reluctance motor comprising a stator 2 having two pairs 3, 4 of oppositely disposed inwardly directed salient poles provided with two pairs 5, 6 of energising windings corresponding to the two phases, and a rotor 7 having a single pair 8 of oppositely disposed outwardly directed salient poles without windings. Each of the four energising windings is wound about its corresponding pole, as indicated by the symbols Y-Y denoting two diametrically opposite portions of each winding of the winding pair 6 and the symbols X-X denoting two diametrically opposite portions of each winding of the winding pair 5. An excitation circuit (not shown) is provided for rotating the rotor 7 within the stator 2 by alternately energising the stator windings in synchronism with rotation of the rotor so that torque is developed by the tendency of the rotor 7 to arrange itself in a position of minimum reluctance within the magnetic field produced by the windings, as will be described in more detail below. Such a variable reluctance motor offers the advantage over a conventional wound rotor motor that a commutator and brushes, which are wearing parts, are not required for supply of current to the rotor. Furthermore other advantages are provided because there are no conductors on the rotor and high-cost permanent magnets are not required.

The symbols + and B in FIGS. 1a and 1b show the directions of current flow in the windings in the two alternate modes of excitation in which the rotor 7 is attracted either to the horizontal position or to the vertical position as viewed in the figures. It will be appreciated that rotation of the rotor 7 requires alternate energisation of the winding pairs 5 and 6, preferably with only one winding pair 5 or 6 being energised at a time, and with the current usually being supplied to each winding pair 5 or 6 in only one direction during such energisation. However the windings can only be energised for a maximum of half the time per revolution if useful torque is to be produced, so that high utilisation of the electrical circuit is not possible with such a motor.

By contrast a fully pitched variable reluctance motor, as described by J. D. Wale and C. Pollock, "Novel Converter Topologies for a Two-Phase Switched Reluctance Motor with Fully Pitched Windings", IEEE Power Electronics Specialists Conference, Baveno, June 1996, pp. 1798-1803 and as shown in FIGS. 2a and 2b (in which the same reference numerals are used to denote like parts as in FIGS. 1a and 1b) comprises two windings 10 and 11 having a pitch which is twice the pole pitch of the motor, that is 180° in the example illustrated, and disposed at 90° to one another. The winding 11 may be wound so that one part of the winding on one side of the rotor 7 fills a stator slot 12 defined between adjacent poles of the pole pairs 3, 4, and another part of the winding 11 on the diametrically opposite side of the rotor 7 fills a stator slot 13 defined between two further adjacent poles of the pole pairs 3, 4. The winding 10 has corresponding parts filling diametrically opposed stator slots 14 and 15. Thus the two windings 10 and 11 span the width of the motor with the axes of the windings 10, 11 being at right angles to one another.

Furthermore two alternate modes of excitation of such a motor corresponding to the horizontal and vertical positions of the rotor 7 are shown in FIGS. 2a and 2b from which it will be appreciated that both windings 10, 11 are energised in both modes of excitation, but that, whereas the direction of current flow in the winding 10 is the same in both modes, the direction of current flow in the winding 11 changes between the two modes. Since current is supplied to both phase windings 10, 11 in both modes and since each winding 10 or 11 occupies half the total stator slot area, such a system can achieve 100% utilisation of its slot area. This contrasts with the 50% utilisation achieved with the conventional wound variable reluctance motor described above in which only one phase winding is energised at a time. Furthermore, since there is no requirement for the direction of current in the winding 10 to change, the winding 10, which may be termed the field winding, can be supplied with direct current without any switching which leads to simplification of the excitation circuit used.

However the winding 11, which may be termed the armature winding, must be energised with current which alternates in synchronism with the rotor position so as to determine the changing orientation of the stator flux required to attract the rotor alternately to the horizontal and vertical positions. The need to supply the armature winding with alternating current in such a motor can result in an excitation circuit of high complexity and cost.

WO 98/05112 discloses a fully pitched flux-switching variable reluctance motor having a four-pole stator 2 which, as shown diagrammatically in FIG. 3a, is provided with a field winding 10 and an armature winding 11 each of which is split into two coils 22 and 23 or 24 and 25 closely coupled (with a coupling which is substantially independent of rotor position) and wound so that diametrically opposite portions of both coils are disposed within diametrically opposite stator slots.

FIG. 3b shows a generalised circuit diagram for energising the armature coils 24 and 25. The coils 24 and 25 are connected within the circuit so that direct current supply to the terminals 26 and 27 flows through both coils 24 and 25 in the same direction so as to generate magnetomotive forces in opposite directions as a result of the opposite winding of the coils. Switches 28 and 29, which may comprise field effect transistors or insulated gate bipolar transistors for example, are connected in series with the coils 24 and 25 and are switched alternately to effect alternate energisation of the coils 24 and 25 so as to provide the required magnetomotive forces acting in opposite directions. It is an advantage of such an arrangement that the armature winding is made up of two closely coupled coils which enables each coil to be energised with current in only one direction so that relatively simple excitation circuitry can be used. A similar arrangement may be provided in an electrical alternator.

The simplifications in the circuitry introduced by WO 98/05112 enable simple and low cost electronic machine control. To achieve optimum performance from the machine disclosed in WO 98/05112 a position sensing means is required to determine the position of the rotor and hence determine the correct state of the switches 28 and 29 for continuous rotation in the required direction. In conventional flux switching machines, the position sensing means could be provided by an optical sensor mounted on the stator of the machine, observing the rotation of a coded disc with reflective or transparent sections. The optical sensor provides an electrical signal which varies in synchronism with the rotation of the rotor. Alternatively the sensor on the stator may be responsive to magnetic polarity such as a Hall effect device and the coded disc on the rotor would contain a magnetic pattern representative of the rotor teeth. Rotation of the coded magnetic disc along with the rotor creates an electrical signal in the stationary sensor which varies in synchronism with the rotation of the rotor. Many other forms of position sensing means are known to those skilled in the art but they all suffer from the problem of mechanical alignment errors. During manufacture of the machine the stationary sensor must be mounted to the stator of the machine at a known or pre-defined position. Furthermore the coded disc must also be mounted on the rotor at a known or pre-defined angular position with respect to the rotor poles. This requires manufacturing processes of a high degree of accuracy which are not therefore easy to implement at low cost.

Such position sensing arrangements are commonly used but have significant mechanical complexity and are not always of low manufacturing cost. Furthermore the alignment of the coded sensor disc to the rotor and the positioning of the electronic pick-up (optical or Hall effect) on the stator must be achieved with precision as the timing of the switching with respect to the rotor position has a direct impact on the performance of the motor. Such alignment is of even greater significance as the running speed of the rotor is increased. A system of rotor position detection which is based entirely on direct or indirect electrical measurements on the stator or its electrical windings is preferred as there is no possibility for mechanical error.

Some prior art methods of detection of rotor position in brushless motors without the use of a mechanical sensor have relied on the re-construction of back emf waveforms to find the zero crossing of the back emf. Such re-construction techniques rely heavily on an accurate model for the resistance and inductance of the armature winding to ensure the re-production of an accurate back emf waveform. Since the resistance will vary within manufacturing tolerance and significantly with temperature and the inductance will vary with manufacturing tolerance and significantly with current levels, such methods are very difficult to implement without significant cost and complexity. In any flux switching machine in which the field mmf is provided by a field winding, a back emf detection method would be further complicated by the non-constant value of the field mmf.

Other prior art methods have used the injection of high frequency signals on top of the normal motoring current in a source winding. The modulation of the high frequency current with position can be decoded in the source winding or in other windings in the machine with complex filtering and signal processing electronics. Further prior art methods have used detailed motor models for the relationship between magnetic flux and current, such models allowing the non-linear current dependent relationships to be accounted for. However such methods still rely on very accurate measurement of magnetic flux which requires accurate electronic circuits and an accurate value of winding resistance at the instant of all measurements. All of the prior art methods require complex electronic circuitry and require some detailed knowledge of the machine and its dependence on physical parameters such as temperature.

A further prior art method of determining the position of the rotor of a motor relative to the stator is disclosed in U.S. Pat. No. 5,821,713 and uses changes in the gradient of the current in a motor winding caused by rotor position dependent changes in the self inductance of the same winding of the motor to estimate the position of the rotor. This method cannot be applied to the flux switching motor because the self inductance does not vary significantly with rotational position of the rotor.

Preferred embodiments of the present invention seek to overcome the above disadvantages of the prior art and seek in particular to provide an electrical machine which has simple control circuitry and has a position sensing means which operates without the requirement of a coded disc on the rotor or sensing device mounted in a specific mechanical position with respect to the stator of the machine and does not require complex electronic circuitry and can work in a motor in which the self inductance of the windings does not vary significantly with position.

According to an aspect of the present invention, there is provided an electrical machine for converting electrical energy into mechanical energy and/or mechanical energy into electrical energy, the machine comprising:

a rotor having a plurality of rotor poles;

a stator for rotatably receiving said rotor and having field magnet means for generating a first magnetomotive force between said rotor and said stator, the stator incorporating at least two electrical windings at least one which is an armature winding adapted to carry electrical current varying in synchronism with rotation of said rotor relative to said stator to generate a varying second magnetomotive force having a component transverse to said first magnetomotive force;

control means for controlling supply of electrical current to the or each said armature winding; and position sensing means for detecting at least one induced first electrical signal dependent on rotational position of said rotor relative to said stator, the or each said first electrical signal being induced in a respective one of said windings by a voltage across at least one other of said windings, said voltage being a requirement of normal operation of the machine to convert electrical energy into mechanical energy and/or mechanical energy into electrical energy, to thereby supply at least one second electrical signal to said control means representative of the rotational position of said rotor relative to said stator.

By providing position sensing means for detecting at least one induced first electrical signal dependent on rotational position of said rotor relative to said stator, the or each said first electrical signal being induced in a respective one of said windings by a voltage across at least one other of said windings, said voltage being a requirement of normal operation of the machine to convert electrical energy into mechanical energy and/or mechanical energy into electrical energy, to thereby supply at leastone second electrical signal to said control means representative of the rotational position of said rotor relative to said stator, this provides the advantage that the or each mutually induced first electrical signal varies significantly, which makes it possible to produce at least one second electrical signal to said control means representing the rotational position of said rotor relative to said stator. In this way, the advantage is provided that no mechanical rotor position detector, requiring a high degree of accuracy during manufacture, or re-construction of back emf waveforms, requiring significant cost and complexity, is required. This in turn provides the advantage that the cost of an electrical machine incorporating the apparatus can be significantly reduced.

In a preferred embodiment, said stator has a plurality of stator poles, and at least one said armature winding is wound with a pitch corresponding to a plurality of stator pole pitches.

Preferably, said field magnet means includes at least one field winding adapted to be connected in series or in parallel with a circuit containing at least one said armature winding.

This provides the advantage that by provision of a suitable switching arrangement controlling energisiation of the field and armature windings, the electronic circuitry controlling energisation of the windings can be simplified.

The position sensing means may be adapted to detect at least one mutually induced first electrical signal from at least one said field winding.

This provides the advantage of simplifying the control circuitry by allowing unidirectional energisation to be applied to the or each field winding and energisation of changing direction to be applied to the or each armature winding.

In a preferred embodiment, the position sensing means is adapted to detect when at least one said mutually induced first electrical signal passes through at least one threshold value to produce at least one second electrical signal. This provides the advantage that at leastone second electrical signal representing the rotational position of the rotor is not affected by changes in condition of the machine which would affect the amplitude of at least one mutually induced first electrical signal.

The position sensing means may be adapted to detect when at least one mutually induced first electrical signal passes through at least one respective threshold value when an electrical winding of the machine is energized with substantially uniform voltage and/or when said winding is not energized the voltage being a requirement of normal operation of the machine to convert electrical energy into mechanical energy and/or mechanical energy into electrical energy.

This provides the advantage that since, when at least one armature coil is energised with substantially uniform or zero voltage, the change in the state of at least one mutually induced first electrical signal in a respective second winding of the machine is due substantially to the change in coupling between the second winding and the armature winding, the passage of the mutually induced first electrical signal through the or each threshold value due to changes in coupling can be easily detected.

The position sensing means may be adapted to determine when to begin and/or end energisation of at least one said armature winding by determining relative proportions of time for which at least one mutually induced first electrical signal is greater than or less than at least one respective threshold value in at least one winding of the machine during a predetermined period of rotation of said rotor.

The position sensing means may be adapted to control timing of energisation of at least one said armature winding to maintain relative proportions of time of at least one mutually induced first electrical signal being greater than or less than at least one respective threshold value in at least one winding of the machine within predetermined limits.

The predetermined limits may be adapted to vary in dependence upon output performance of said machine.

The position sensing means may be adapted to control timing of said energisation by means of at least one error signal input to said control means.

The position sensing means may be adapted to selectively control timing of said energisation in response to failure to detect at least one mutually induced first electrical signal passing through a threshold value during a predetermined period.

The position sensing means may be adapted to detect when at least one said mutually induced first electrical signal passes through at least one respective threshold value to produce at least one said second electrical signal, at least one said threshold value being a function of an average value of the corresponding said mutually induced first electrical signal.

The position sensing means may be adapted to extract at least one mutually induced first electrical signal dependent on rotational position of said rotor relative to said stator, from the rate of change of current occurring in an electrical winding of the machine arising as a result of the existence of a voltage across one or more other of the said electrical windings of the machine.

The position sensing means may include at least one respective coil adapted to be magnetically coupled to a magnetic field generated by a conductor carrying the current passing through at least one said winding.

This provides the advantage of simplifying the extraction of the or each mutually induced first electrical signal dependent on rotational position of said rotor relative to said stator, from the current occurring in an electrical winding of the machine since the voltage across the said coil can be used as the corresponding mutually induced first electrical signal.

In a further embodiment, the position sensing means is adapted to obtain data relating to at least one said mutually induced first electrical signal and compare said data with data relating to at least one known rotor position.

The position sensing means may be adapted to provide at least one said second electrical signal representative of rotational position of the rotor at standstill by determining at least one mutually induced first electrical signal in at least one electrical winding when at least one other electrical winding of the machine is energised.

The control means may be adapted to cause said rotor to move relative to said stator to a position of stable equilibrium in response to at least one second electrical signal from said position sensing means generated at standstill of said rotor.

The position sensing means may be adapted to indicate the nearest position of stable equilibrium of said rotor relative to said stator by observing the respective mutually induced first electrical signal in at least one said electrical winding when at least one other electrical winding of the machine is energized.

The position sensing means may be adapted to monitor at least one said mutually induced first electrical signal by intermittently sampling said signal.

The position sensing means may be adapted to monitor at least one said second electrical signal by intermittently sampling said signal.

According to another aspect of the present invention, there is provided a method of controlling an electrical machine for converting electrical energy into mechanical energy and/or mechanical energy into electrical energy, the machine comprising a rotor having a plurality of rotor poles and a stator for rotatably receiving said rotor and having field magnet means for generating a first magnetomotive force between said rotor and said stator, the stator having at least two electrical windings at least one of which is a respective armature winding adapted to carry electrical current varying in synchronism with rotation of said rotor relative to said stator to generate a varying second magnetomotive force having a component transverse to said first magnetomotive force, the method comprising the steps of:

detecting at least one induced first electrical signal dependent on rotational position of said rotor relative to said stator, the or each said first electrical signal being induced in a respective one of said windings by a voltage across at least one other of said windings, said voltage being a requirement of normal operation of the machine to convert electrical energy into mechanical energy and/or mechanical energy into electrical energy;

supplying at least one second electrical signal representative of the rotational position of said rotor relative to said stator; and controlling supply of electrical current to the or each said armature winding in response to at least one said second electrical signal.

The method may further comprise the step of detecting at least one mutually induced first electrical signal from at least one said field winding.

The method may further comprise the step of detecting when at least one said mutually induced first electrical signal passes through at least one threshold value to produce at least one said second electrical signal.

The method may further comprise the step of detecting when at least one mutually induced first electrical signal passes through at least one respective threshold value when an electrical winding of the machine is energized with substantially uniform voltage and/or when said winding is not energized the voltage being a requirement of normal operation of the machine to convert electrical energy into mechanical energy and/or mechanical energy into electrical energy.

The method may further comprise the step of determining when to begin and/or end energisation of at least one said armature winding by determining relative proportions of time for which at least one mutually induced first electrical signal is greater than or less than at least one respective threshold value in at least one winding of the machine during a predetermined period of rotation of said rotor.

The method may further comprise the step of controlling timing of energisation of at least one said armature winding to maintain relative proportions of time of at least one mutually induced first electrical signal being greater than or less than at least one respective threshold value in at least one winding of the machine within predetermined limits.

The method may further comprise the step of varying said predetermined limits in dependence upon output performance of said machine.

The method may further comprise the step of controlling timing of said energisation by means of at least one error signal.

The method may further comprise the step of selectively controlling timing of said energisation in response to failure to detect at least one mutually induced first electrical signal passing through a threshold value during a predetermined period.

The method may further comprise the step of detecting when at least one said mutually induced first electrical signal passes through at least one respective threshold value to produce at least one second electrical signal, at least one said threshold value being a function of an average value of the corresponding said mutually induced first electrical signal.

The method may further comprise the step of extracting at least one mutually induced first electrical signal dependent on rotational position of said rotor relative to said stator, from the rate of change of current occurring in an electrical winding of the machine arising as a result of the existence of a voltage across one or more other of the said electrical windings of the machine.

The method may further comprise the step of obtaining data relating to at least one said mutually induced first electrical signal and compare said data with data relating to at least one known rotor position.

The method may further comprise the step of providing at least one said second electrical signal representative of rotational position of the rotor at standstill by determining at least one mutually induced first electrical signal in at least one electrical winding when at least one other electrical winding of the machine is energised.

The method may further comprise the step of causing said rotor to move relative to said stator to a position of stable equilibrium in response to at least one second electrical signal from said position sensing means generated at standstill of said rotor.

The method may further comprise the step of indicating the rarest position of stable equilibrium of said rotor relative to said stator by observing the respective mutually induced first electrical signal in at least one said electrical winding when at least one other electrical winding of the machine is energized.

The method may further comprise the step of monitoring at least one said mutually induced first electrical signal by intermittently sampling said signal.

The method may further comprise the step of monitoring at least one said second electrical signal by intermittently sampling said signal.

According to a further aspect of the present invention, there is provided a method of determining the rate of change of current in at least one winding of an electrical machine for converting electrical energy into mechanical energy and/or mechanical energy into electrical energy, the method comprising monitoring a voltage induced in at least one respective coil magnetically coupled to a magnetic field generated by a conductor carrying said current.

BRIEF DESCRIPTION OF THE DRAWINGS

Preferred embodiments of the invention will now be described, by way of example only and not in any limitative sense, with reference to the accompanying drawings, in which:

FIG. 3b is a circuit diagram of an excitation circuit for exciting the windings of FIG. 3a;

FIG. 9b shows a simple circuit for the differentiation of the current signal and then using a comparator for the detection of the sign of the gradient in the embodiment of FIG. 9a;

FIGS. 17(a) and 17(b) shows the implementation of an embodiment of the invention for adaptive pulse positioning;

FIGS. 20(a) and 20(b) shows an implementation of a control algorithm used in the embodiment of FIG. 19;

FIG. 21 shows a complete flux switching motor drive of a fifth embodiment of the invention;

FIGS. 22(part i), 22(part ii), 23(part i) and 23(part ii) show test results obtained with the circuit of FIG. 21 on a practical flux switching motor embodying the present invention;

DETAILED DESCRIPTION

Power Electronic Configurations

Figure 1A:
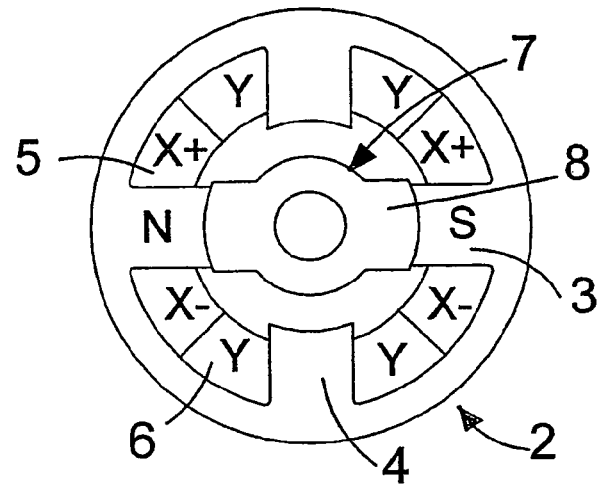
FIGS. 1a and 1b are explanatory diagrams showing a prior art two-phase variable reluctance motor, with the two excitation modes being shown in FIGS. 1a and 1b.
Figure 1B:
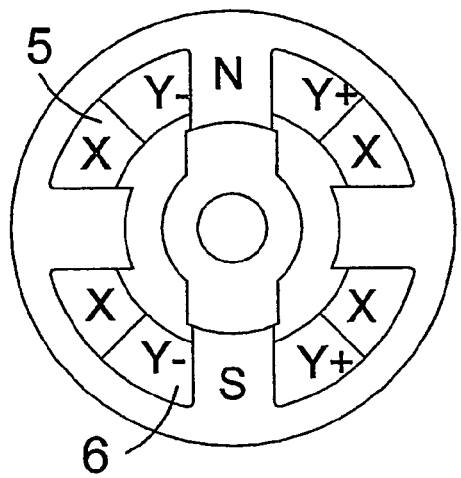
Figure 2A:
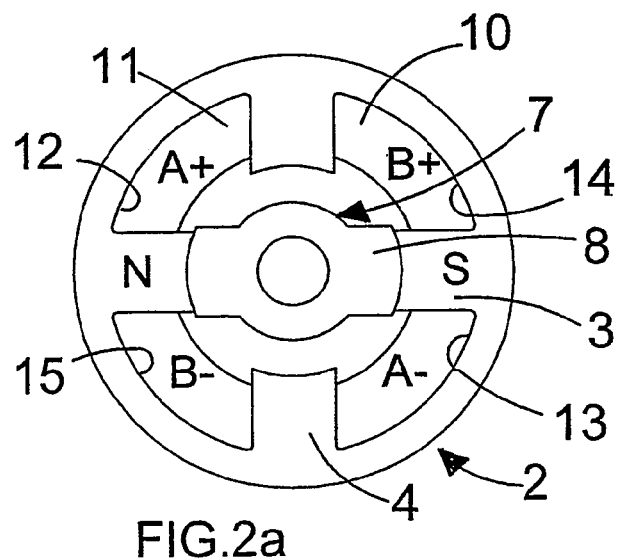
FIGS. 2a and 2b are explanatory diagrams showing a prior art flux-switching machine, with the two excitation modes being shown in FIGS. 2a and 2b.
Figure 2B:
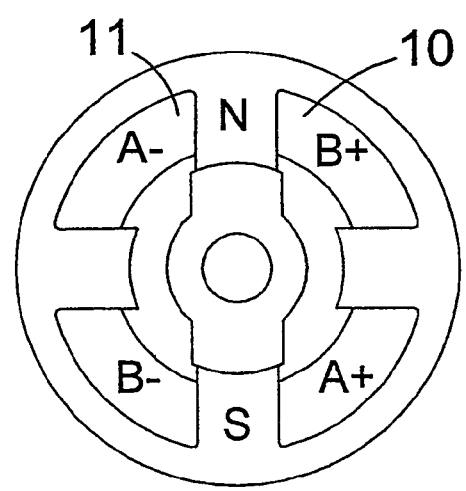
Figure 3A:
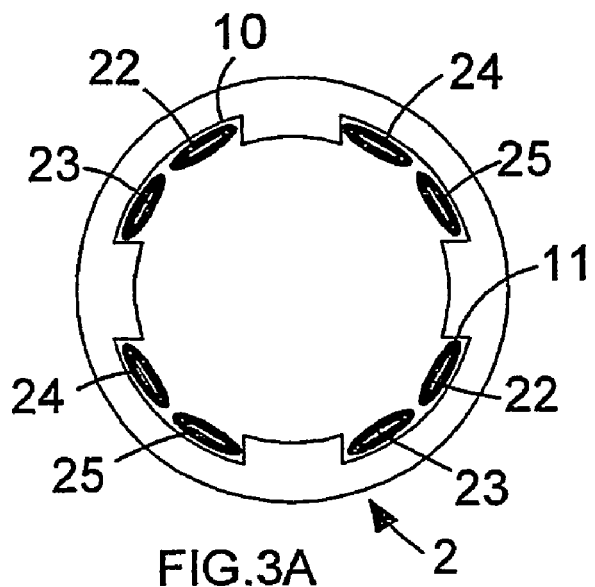
FIG. 3a is an explanatory diagram showing the stator windings for a prior art two-phase variable reluctance motor as disclosed in WO 98/05112.
Figure 3B:
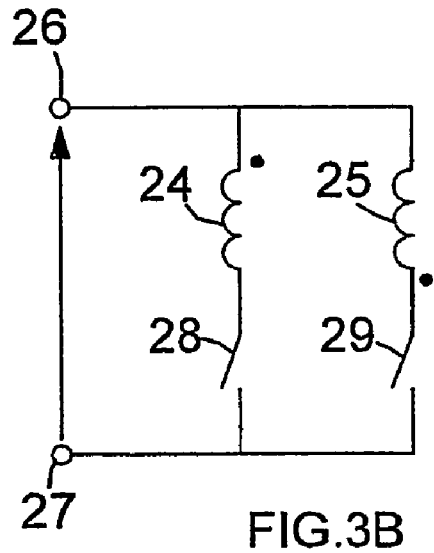
Figure 4:
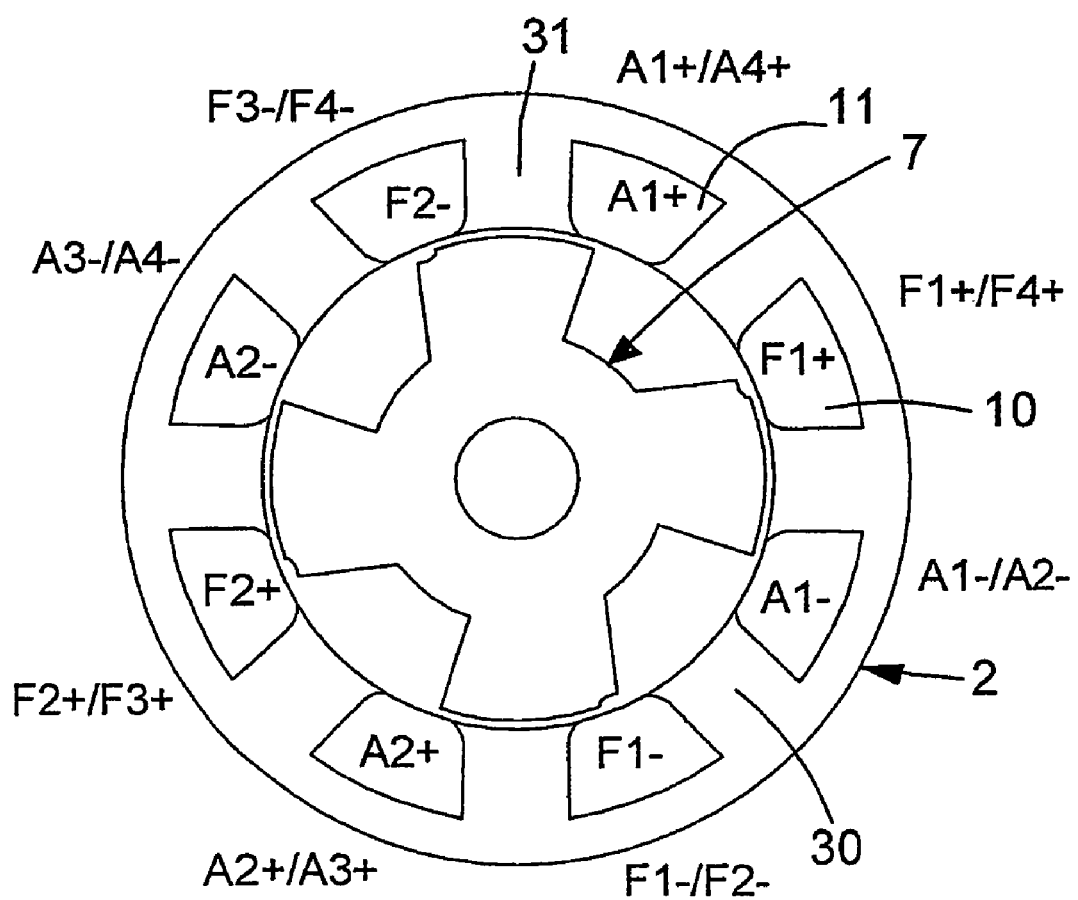
FIG. 4 is a diagram of a flux-switching motor for use in an electrical machine embodying the present invention and having an 8-pole stator and a 4-pole rotor.

Referring to FIG. 4, a flux-switching machine has a stator 2 provided with eight inwardly directed salient poles 30 and a rotor 7 having four outwardly directed salient poles 31 without windings. The stator 2 is provided with a field winding 10 and an armature winding 11. The field winding is normally arranged to carry current in the same direction while the armature winding is arranged to carry alternating current. In the machine shown in FIG. 4 one cycle of armature current corresponds to one rotor pole pitch of rotation. One cycle of armature current therefore corresponds to 90 of rotation of the rotor.

In FIG. 4 the armature windings comprise two coils A1, A2 each spanning two stator slots, or four coils A1, A2, A3, A4 wound around the stator poles such that the active portions of adjacent coils are accommodated within the same stator slot. The coils are connected together in series or in parallel to form the armature winding. It will be understood that the positive and negative signs in the armature slots of FIG. 4 illustrate the armature current polarity in one of the two modes of armature excitation. Reversal of armature current direction will change the current direction in all four armature slots.

Similarly the field winding in the 8 slot stator of FIG. 4 comprises two coils F1, F2 each spanning two stator slots, or four coils F1, F2, F3, F4 wound around the stator poles such that the active portions of adjacent coils are accommodated within the same stator slot. The coils are connected together in series or in parallel to form the field winding.

Figure 5C:
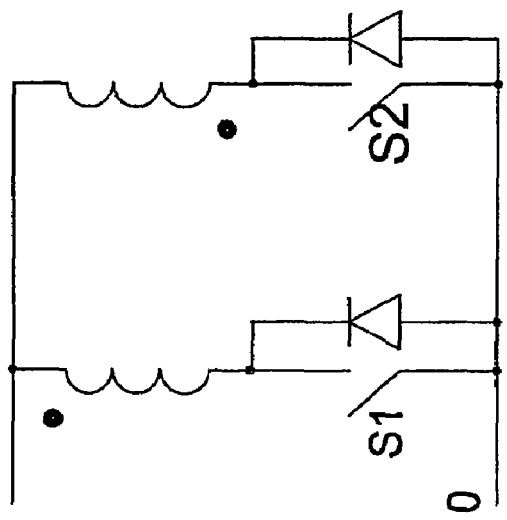
FIGS. 5a, 5b and 5c are circuit diagrams showing circuit arrangements for energising an armature winding of flux-switching motors of embodiments of the invention.

The bi-directional current in the armature winding can be controlled using a number of circuit arrangements (inverters) examples of which are shown in FIG. 5.

Figure 5B:
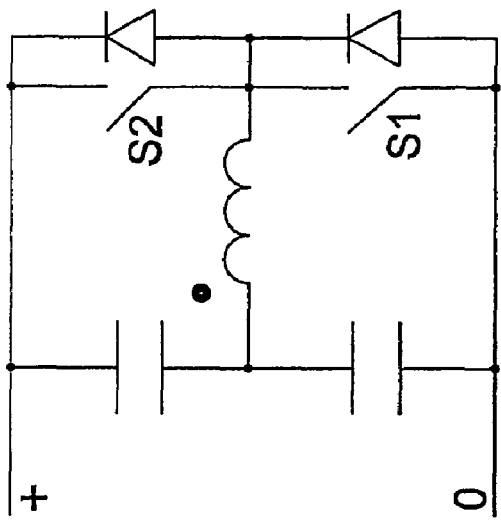
Figure 5A:
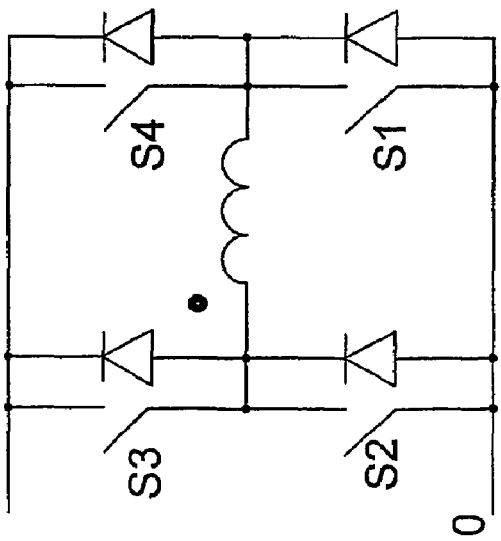

FIG. 5a shows a full bridge inverter which employs 4 semiconductor switches and 4 diodes. Turning on the switches $S_1$ and $S_3$ allows positive current to flow through the armature winding. Turning on the switches $S_2$ and $S_4$ allows negative current to flow through the armature winding. Once current is established in either direction additional operating modes can be employed whereby one switch and one diode conduct with zero voltage being applied to the armature winding.

FIG. 5b shows a further inverter circuit in which two semiconductor switches are required in conjunction with two capacitors. The two capacitors form a bipolar power supply relative to the node between the two capacitors. Turning on the switch $S_1$ allows positive current to flow through the armature winding. Turning on the switch $S_2$ allows negative current to flow through the armature winding. The diode in parallel with each switch conducts the current when the opposite switch is turned off.

Alternatively, each armature winding part (A1 and A2 or A1, A2, A3 and A4) is split into two coils which are closely magnetically coupled. The armature coils are wound in opposite directions and may be bifilar wound where appropriate and connected, for example, as described with reference to FIG. 6 of WO 98/05112 such that each of the armature windings comprises four coils A1, A2, A3, A4 connected together in series or in parallel and wound around the stator poles such that the active portions of adjacent coils are accommodated within the same stator slot. These two armature windings can then be connected to a further inverter circuit as described in WO 98/05112 and shown in FIG. 5c. Turning on the switch $S_1$ allows positive current to flow through the armature winding. Turning on the switch $S_2$, energises the second of the armature windings, and as this is connected to the power supply in the opposite manner the effective current in the armature slots is negative. The diode in parallel with each switch conducts the current when the opposite switch is turned off.

Figure 6A:
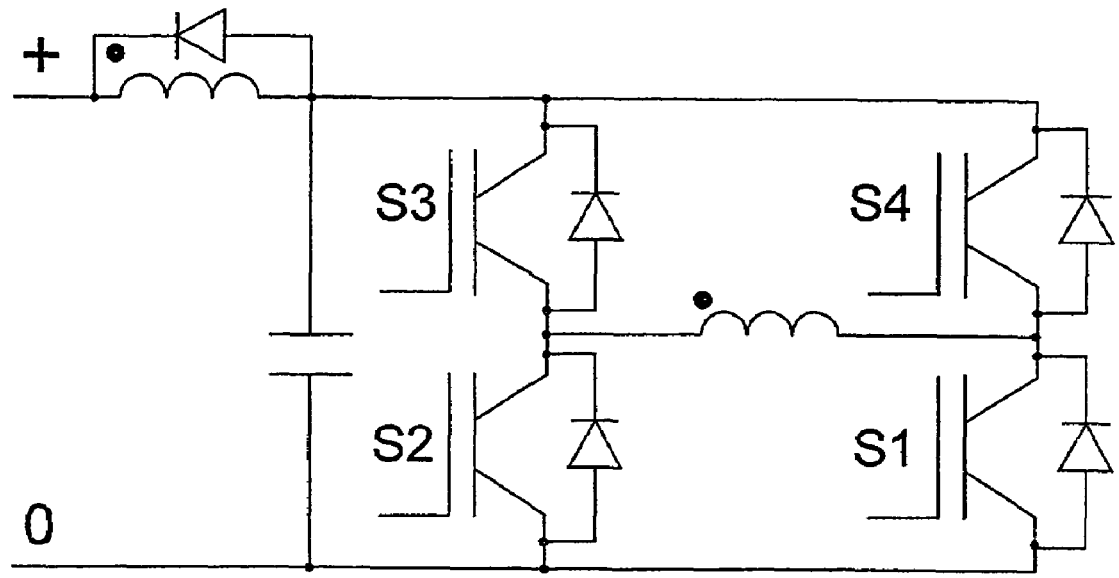
FIGS. 6a and 6b are circuit diagrams showing circuit arrangements for energising the field and armature windings of embodiments of the invention.
Figure 6B:
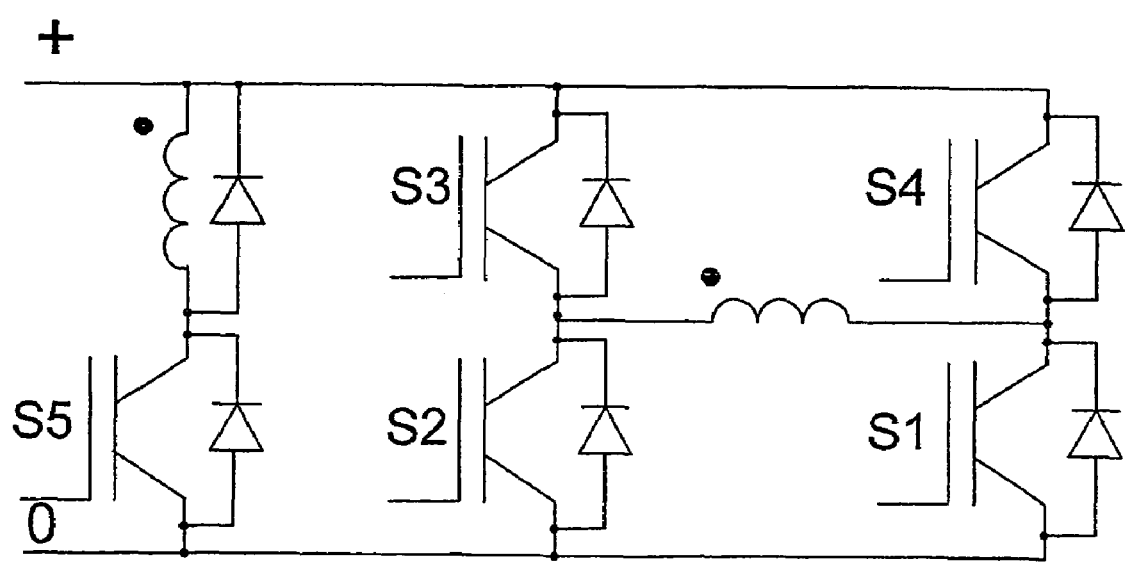
Figure 7A:
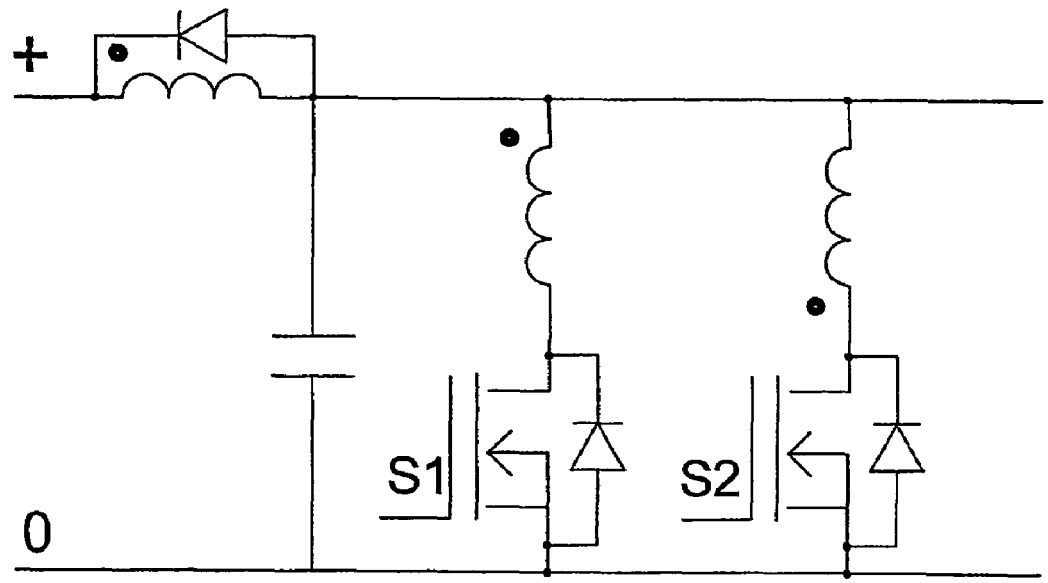
FIGS. 7a and 7b are circuit diagrams showing further circuit arrangements for energising the field and armature windings of embodiments of the invention.
Figure 7B:
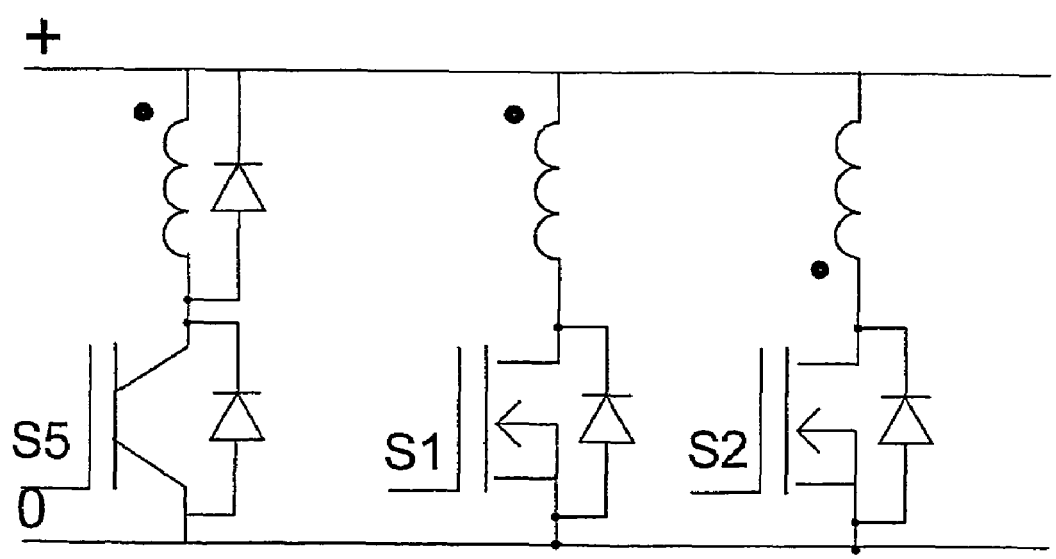

The uni-directional current in the field winding can be achieved by connecting the field winding in series with the armature switching arrangement (FIG. 6a and FIG. 7a) or in a shunt arrangement where the field winding is in parallel with the armature switching arrangement (FIG. 6b and FIG. 7b). In the series configuration a diode or a capacitor or both may also be included as disclosed in WO 98/05112. In the shunt configurations shown in FIGS. 6b and 7b an additional switch ($S_5$) and diode are shown to provide control of the field current excitation independently of the armature switching arrangement. This additional switch is optional. A further alternative is to have some of the field winding connected in series and some connected in shunt with the armature switching arrangement. Furthermore, the field winding 10 may be supplied with current from a separate current source.

The armature winding 11 may comprise two armature winding parts A1 and A2 connected in series or in parallel, and the field winding 10 may comprise two field winding parts F1 and F2 connected in series or in parallel, the winding parts being wound on the stator 2 as shown within the stator in FIG. 4.

The winding configuration in this case is shown in FIG. 4 by the symbols indicated outside the stator in the figure; In FIG. 4 the symbols + and − show the directions of current flow in the windings in one mode of excitation, and it will be understood that, in the alternate mode of excitation, the direction of current flow in the armature windings is reversed whereas the direction of current flow in the field windings is unchanged.

It will be understood by persons skilled in the art that, in all the circuit embodiments, the direction of current flow in the armature slots is periodically reversed whereas the direction of current flow in the field windings is unchanged.

Fundamental Position Estimation Method and Low Speed Implementation

In all the power electronic embodiments of the flux switching machine the application of a voltage to an armature winding (or a field winding) creates a mutually induced electrical signal in the form of an induced voltage within the field winding (or an armature winding). The magnitude and sign of the induced voltage depends on the rotor position. The subsequent description will explain how this induced voltage can be easily detected and used to determine the position of the rotor and hence control the machine. Since the most usual mode of operation of a flux switching machine is to control the voltage and/or current applied to the armature and to connect the field winding in series or in shunt with the controlled armature, the subsequent description of the invention will assume that the voltage is being applied to the armature winding and that the detection of the mutually induced electrical signal is associated with the field winding. It is understood that the voltage applied to an armature and/or the field winding to cause the motor to rotate is what can be defined as the voltage required for normal operation of the machine.

The magnitude of the induced voltage within the field winding due to excitation of the armature winding is greatest when the rotational position of the rotor is near the aligned position with respect to the stator poles. This is also the rotor position where the rate of change (with respect to rotor position) of the induced voltage within the field winding is a minimum i.e. there is limited change in the magnitude of the induced voltage within the field winding at positions either side of these aligned positions. These aligned positions are positions where the induced armature back emf is zero and is the ideal point for reversal of the polarity of armature excitation for optimal electromechanical energy conversion.

Figure 8:
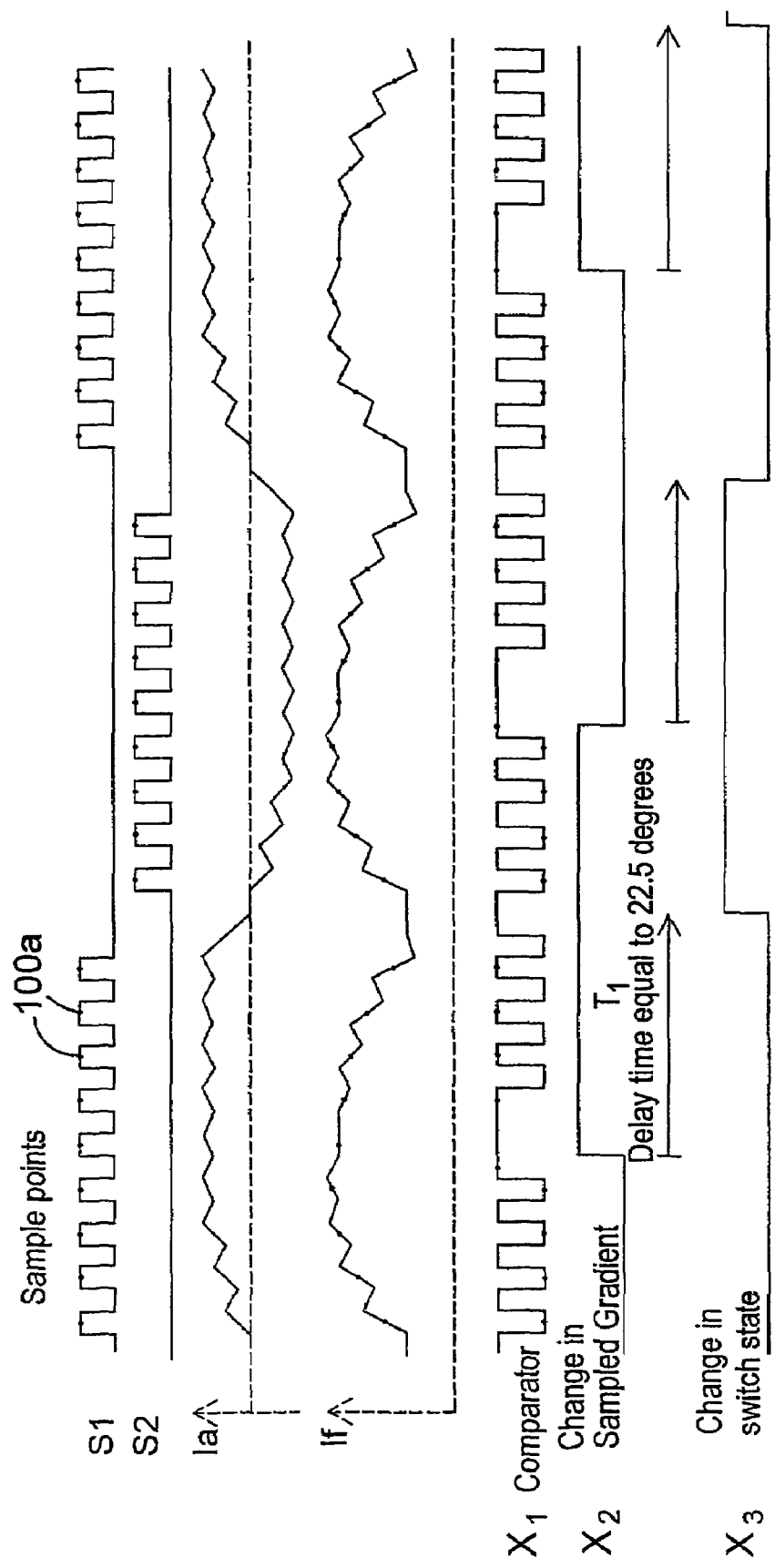
FIG. 8 shows waveforms and timing for implementation of one embodiment of the invention.

One implementation of the fundamental position detection method is shown in FIG. 8. FIG. 8 shows the operation of the flux switching motor with a series connected field winding. The operation in FIG. 8 is at a speed where the induced armature emf is significantly lower than the available armature supply voltage such that modulation of the armature switches is required during each armature conduction block to avoid the armature current reaching excessive levels. The switch signals shown in FIG. 8 are for Switch $S_1$ and $S_2$. If the armature is controlled by a full bridge inverter as shown in FIGS. 6a and 6b the switches $S_3$ and $S_4$ may follow the same pattern as $S_1$ and $S_2$ respectively (hard chopping) or may be left on during each respective armature conduction block (soft chopping).

Every time switch $S_1$ is turned on (with $S_3$ if present) the voltage across the armature winding is positive, creating a positive flow of armature current, $I_a$. The increasing armature flux linkage induces a induced voltage within the field winding, the direction and magnitude of which is a function of position. This induced voltage within the field winding superimposes a fluctuation in the gradient of field current. This fluctuation can be extracted to provide a mutually induced electrical signal dependent on rotational position of the rotor.

At the start of each armature conduction block of positive armature mmf (shown by the start of the trace $I_a$ in FIG. 8) the application of a positive voltage to the armature induces a voltage within the field winding which superimposes a positive gradient in the field current. At this time, the induced gradient of the field current is negative when the negative voltage is applied to the armature winding during a time when the switch(es) are off.

The induced voltage within the field winding and hence the superimposed gradient in the field current reduces to zero at some point during the armature conduction block and the superimposed gradient of the field current is negligible irrespective of the state of the voltage being applied to the armature. In this region, the armature back emf is usually maximum and the most torque is produced for a given armature current. It is usual that this will be near the middle of the armature conduction block.

Towards the end of the armature conduction block of positive mmf the superimposed gradient of the field current is negative when the positive voltage is applied to the armature and the superimposed gradient of the field current is positive when the negative voltage is applied to the armature winding.

As the rotor rotates, near to a position where the rotor is aligned with the stator, the polarity of the armature mmf should ideally be reversed to maintain torque in the required direction.

From this superimposed gradient of the field current, the simplest possible position detection scheme would detect the polarity of the superimposed gradient of the field current when the respective armature switch is turned on, at the sample points shown by the dots 100a in FIG. 8. FIG. 8 shows an implementation in which the sign of the superimposed gradient of the field current is tested by a comparator to determine if it is positive (low output from the comparator) or negative (high output from the comparator). When the superimposed gradient of the field current is positive during the on-time of the respective switch (as occurs during the first part of each armature conduction block) the comparator signal $X_2$ in FIG. 8 is low at each sample point. During successive on-times of the switch the superimposed gradient of the field current decreases but the comparator is still low at the point of sampling represented by the black dots 100a. Near the centre of the armature conduction block the superimposed gradient of the field current becomes negative when the switch is on and positive when the switch is off. The sample point therefore returns a high value for the comparator. This change from the previous sample is used to change the state of a logic signal $X_2$. This logic signal $X_2$ is ahead of the point where the polarity of the armature current needs to be reversed by approximately half a stator pole pitch, i.e. approximately 22.5° in FIG. 4 (see $T_2$ in FIG. 8). The exact position will be dependent on motor design features and the running speed of the machine and the required torque. Knowing the speed of the rotor, the point at which the opposite switch(es) need to be used to reverse the polarity of the armature mmf can be predicted as indicated by the arrows in FIG. 8.

At the start of an armature conduction block of negative armature mmf the superimposed gradient of the field current is positive when the negative voltage is applied to the armature and the gradient of the field current is negative when the positive voltage is applied to the armature winding.

The induced voltage in the field winding and hence the superimposed gradient in the field current passes through zero near the centre of the armature conduction block of negative mmf. At the end of the armature conduction block of negative mmf the superimposed gradient of the field current is negative when the negative voltage is applied to the armature and the superimposed gradient is positive when the positive voltage is applied to the armature winding.

The logic required to detect the change in state of the comparator between successive samples is the same whether it is a positive or negative conduction block.

The detection of only the polarity of the superimposed gradient of the field current avoids the need for absolute measurement of the superimposed gradient of the field current as this would be very dependent on motor parameters and other circuit parameters. However, despite these problems, additional position information can be obtained by monitoring the absolute value of the superimposed gradient of the field current at each point.

Differentiation Methods

Figure 9A:
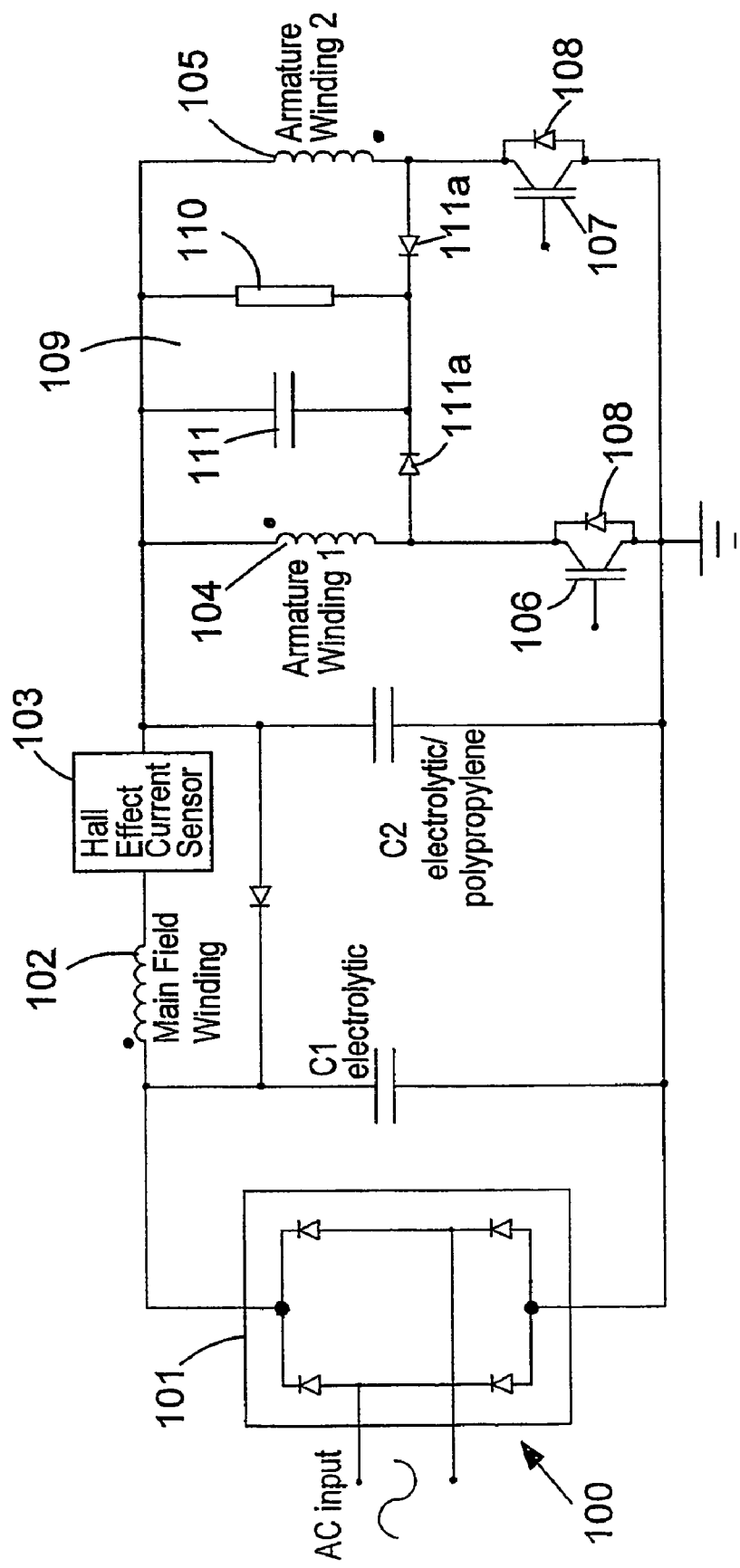
FIG. 9a shows a circuit arrangement of a first embodiment of the present invention for the measurement of the field current using a Hall effect current transducer.
Figure 9B:
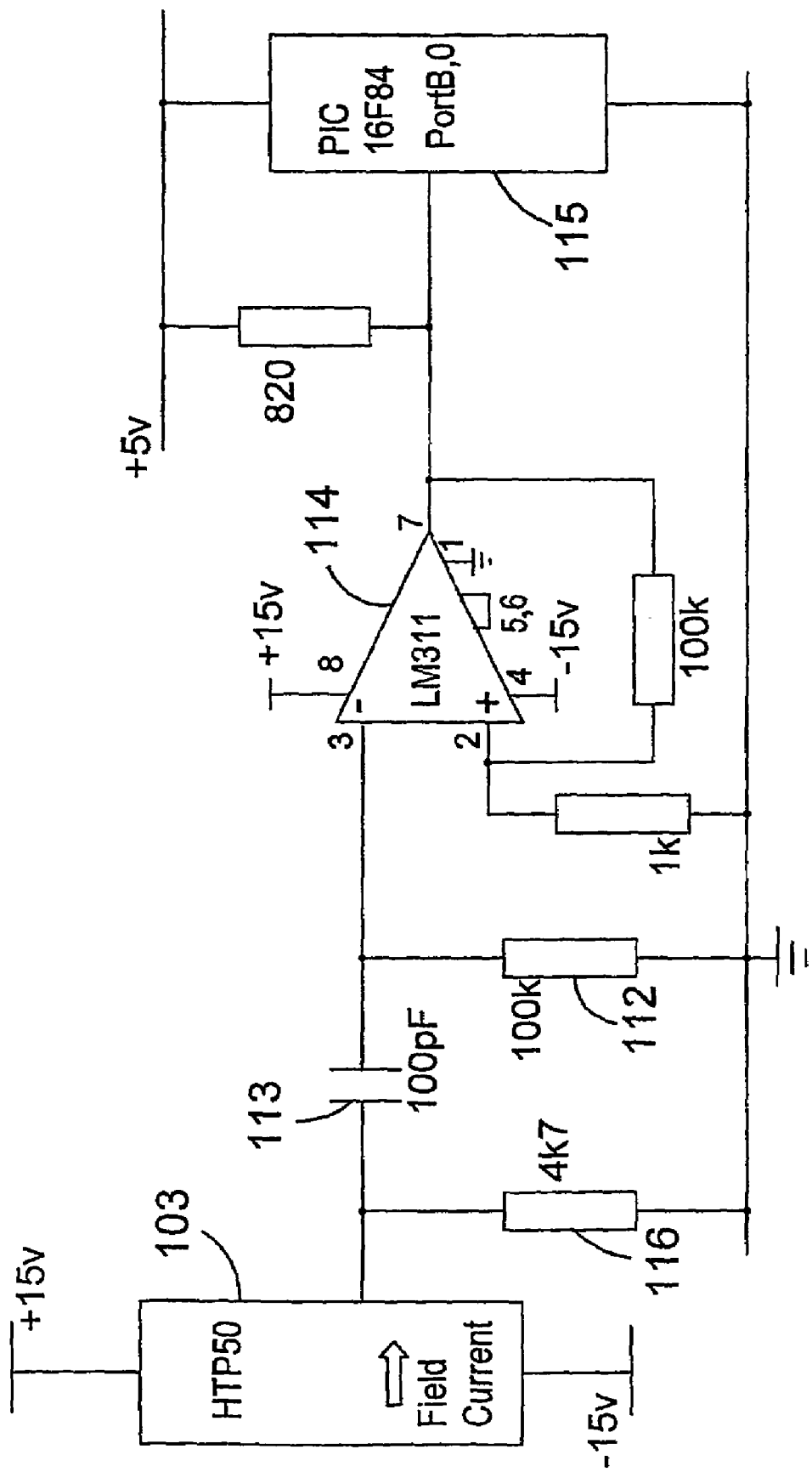

Implementation of the invention can be achieved by measurement of the current in the field winding 102 of the machine, followed by a circuit which differentiates the signal representing the field current. The differentiated signal is representative of the rate of change of the current and its value can be used to compute the position of the rotor. A Hall effect current transducer 103 can be employed to measure the current flowing in the field winding 102 and an analogue differentiation circuit employing a simple CR (112 and 113) circuit as shown in FIGS. 9a and 9b can be used. Referring to FIG. 9a, rectified dc current from an ac power supply 100 is supplied via rectifier bridge 101 to the field winding 102, which is connected in series with a Hall effect current transducer 103. A pair of armature windings 104, 105 in a closely coupled bifilar winding are selectively connected in series with the field winding 102 by means of respective transistor switches 106, 107. Each of the switches 106, 107 is provided with a diode 108 to conduct current induced in the winding 104, 105 when the switch 107, 106 controlling the other winding 105, 104 is switched off. A snubber circuit 109 comprising a resistor 110, capacitor 111 and two diodes 111a prevents voltages induced in the windings 104, 105 from damaging the switches during the switching transition. The role of the snubber circuit 109 is to absorb energy associated with the leakage inductance of the closely coupled armature windings. The operation of the snubber circuit 109 is described in more detail in WO98/05112.

In the simplest embodiment of the invention sufficient information to control the motor can be obtained from the detection of the polarity of the gradient of the field current without extraction of the signal representing the superimposed gradient of the field current. More specifically sufficient information to control the motor can be obtained from the detection of a reversal in the polarity of the gradient of the field current which is not caused by a change in state of the switches in the power electronic converter. In such an embodiment the use of a comparator 114 setup to compare the differentiated field current signal to a zero level will produce a logic high or a logic low, dependent only on the polarity of the gradient of the field current. These logic signals can be used directly as an input to a digital controller implemented, for example, in a microcontroller 115. This is also shown in FIG. 9b.

As shown in more detail in FIG. 9b, the output voltage of Hall effect current transducer 103 developed across resistor 116 is proportional to the magnitude of the current flowing in the field winding 102, and is input to a differentiating circuit including a resistor 112 and a capacitor 113, the output of which (representing the rate of change of current in the field winding 102) is input to a comparator 114. The output signal from comparator 114, indicating whether the rate of change of current in the field winding 102 is positive or negative, is input to a controller 115 which controls the operation of switches 106, 107.

Figure 10:
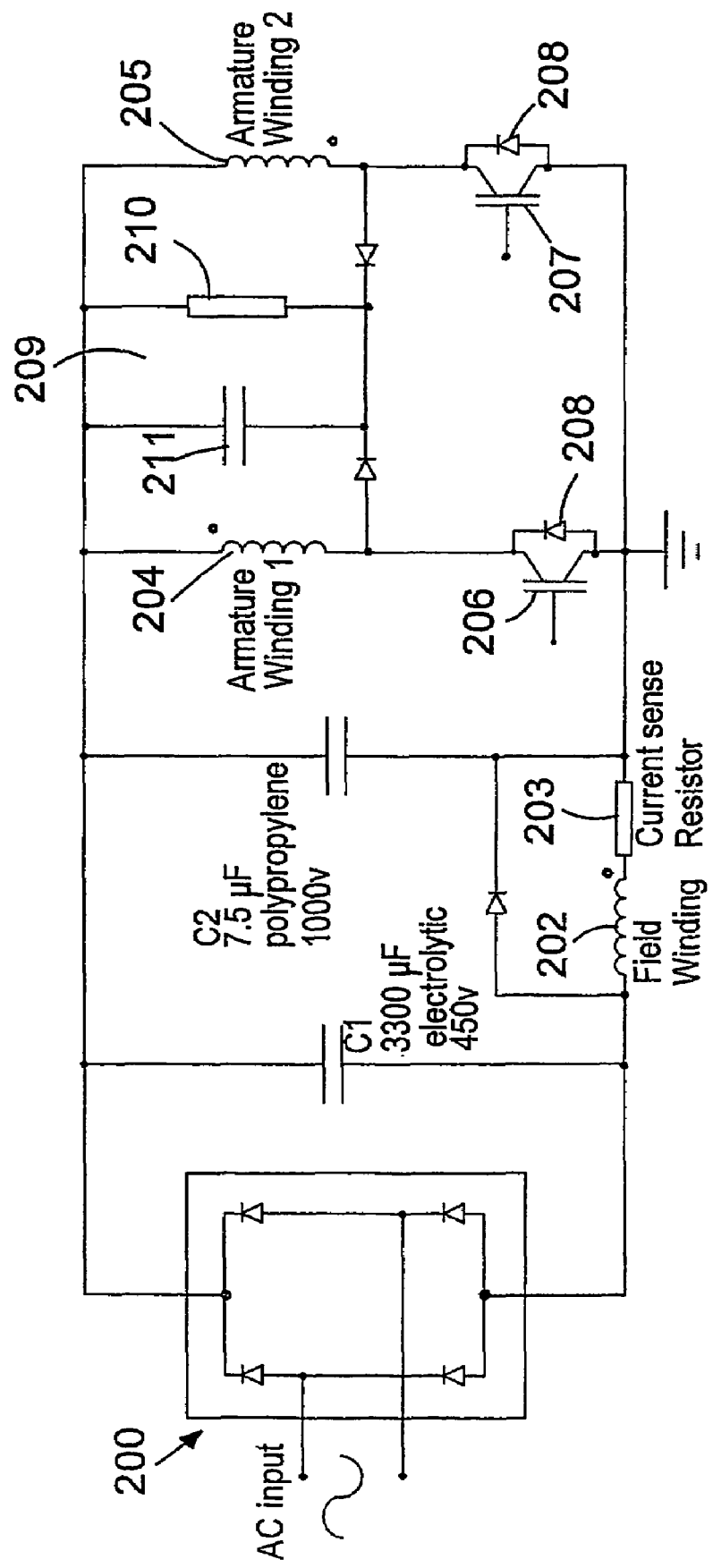
FIG. 10 shows a second embodiment of the present invention, in which the field current is measured using a ground referenced resistor.

In a practical flux switching drive it is preferable if the field current can be sensed with a ground referenced resistor rather than a more expensive Hall effect current transducer. A circuit which implements this is shown in FIG. 10, in which parts common to the embodiment of FIG. 9a are denoted by like reference numerals but increased by 100, and which allows the signal obtained to be immediately referenced to the same ground as all the logic and power switches. The signal is now inverted relative to measurement of the field current in the positive rail but this can be accounted for. The voltage across resistor 203 can then be input to a differentiating circuit as in FIG. 9b.

Whilst the embodiments so far described allow measurement of the current in a winding and differentiation of this signal at relatively low cost, the simple differentiator has limited bandwidth and no voltage gain. A higher performance circuit would use an analogue differentiator circuit implemented using operational amplifiers, as will be familiar to persons skilled in the art. Care must be taken to minimise noise and phase delay in such a circuit.

A preferred embodiment of the invention achieves the differentiation of the winding current in a single step by monitoring the voltage induced in a coil, coupled to the magnetic field surrounding a conductor carrying the current in a winding of the machine. A conductor carrying the field current of the machine has a magnetic field surrounding it which is proportional to the current flowing in the conductor. A coil (or single turn) is arranged to couple with the magnetic field surrounding the conductor and will have a voltage induced in the coil which is proportional to the rate of change of the current in the conductor. The field around the conductor can be usefully enhanced by arranging for the field of the conductor to link the coil with a suitable magnetic path of relative permeability greater than one. A preferred arrangement would employ a simple magnetic core and coil with the conductor carrying the current to be differentiated passing through the centre of the core as shown in FIG. 11a.

Alternatives can be envisaged using a wide range of magnetic coupling arrangements. The conductor and the coil could be on the surface of a printed circuit board as shown in FIG. 11b. The magnetic coupling of such an arrangement can be enhanced, if necessary, by the addition of magnetic material above and below the printed circuit board.

Figure 11A:
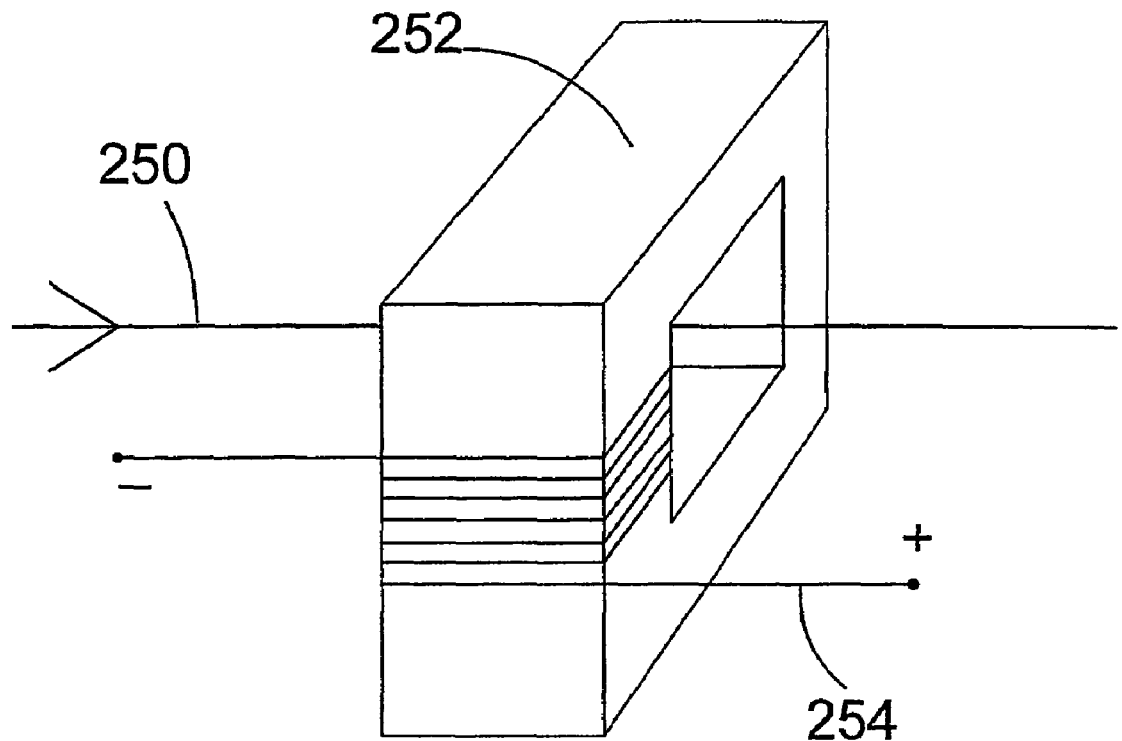
FIGS. 11a and 11b show parts of third and fourth embodiments of the invention in which the magnetic field around a conductor carrying the current to be differentiated produces a voltage in a coil which is proportional to the rate of change of the current.
Figure 11B:
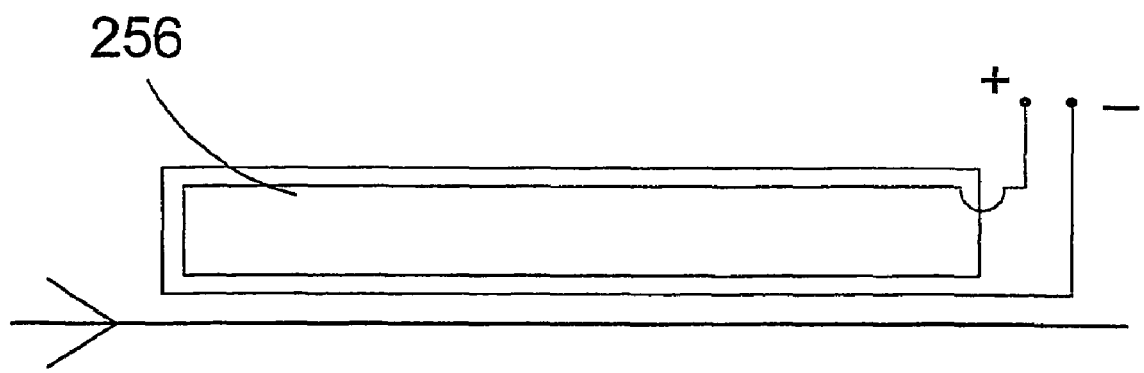

In the simplest possible detection scheme the voltage induced in the coil in FIG. 11a or 11b is applied directly to the positive and negative signal inputs of a voltage comparator. The electrical output signal from the comparator will be logic high or logic low depending on the sign of the gradient of the current in the conductor passing through the coil. The electrical output signal of the comparator contains the information about the rotational position of the rotor and can be used as an input to a digital controller according to the invention.

Figure 12:
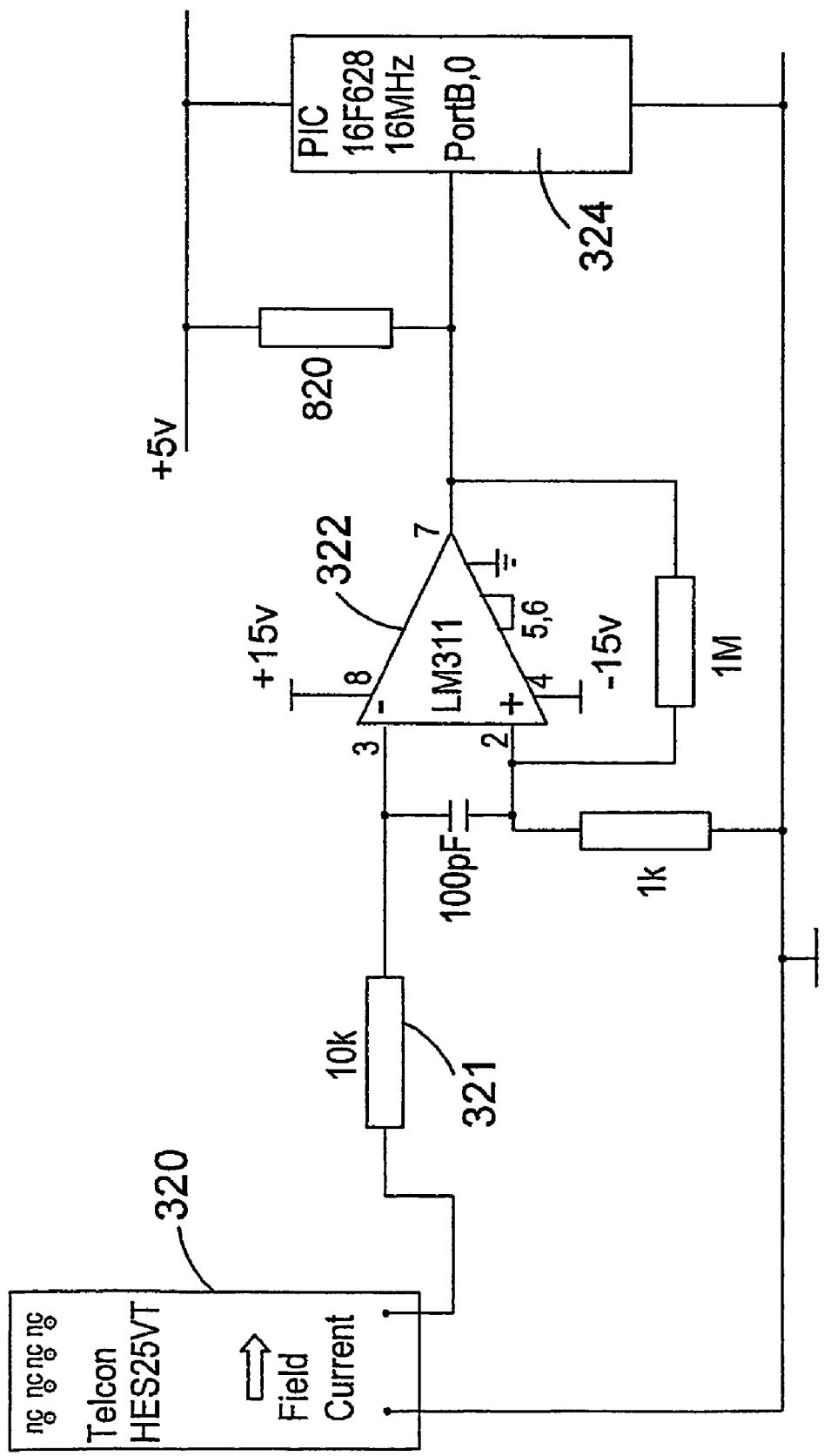
FIG. 12 shows a circuit implementation of the embodiments of FIGS. 11a and 11b with component values implemented in a practical motor drive.

In one practical implementation of the invention shown in FIG. 12 a conductor carrying the field current passes through the middle of a toroidal core 320 with a 1000 turn coil. (Telcon core HES 25VT). The voltage on the coil is directly proportional to the rate of change of flux in the core and hence the rate of change of field current. One end of the coil is fed via a 10 k resistor 321 directly to the first input of a comparator 322 with no analogue processing necessary. The second end of the coil is connected to the second input of the comparator 322 and which, in this case, is also the zero voltage supply rail. The output of the comparator 322 is used as an input to a microcontroller 324 containing motor control algorithms and logic to decode the rotational position of the rotor from the electrical output signal of the comparator. The microcontroller is arranged to record the state of the comparator at predetermined sample points as described earlier and determine the point at which two successive samples change state. A prediction of the ideal point for reversal of the armature excitation can then be made based on the rotor speed and the time taken for the rotor to rotate a further half a stator pole pitch. Further control algorithms will be described in greater detail below.

This embodiment of the invention requires no measurement and conditioning of the actual field current which makes it extremely low cost and very stable against changes in motor parameters due to manufacturing variations or temperature. The second end of the coil may be connected to any chosen reference voltage or simply connected to only the comparator.

High Speed Implementation

As the speed of the motor increases the need to modulate the value of the armature current through repetitive pwm throughout each armature conduction block reduces. This is particularly true in circuits of FIGS. 7a and 7b where the armature is made up of two closely coupled windings. In these circuits, repetitive switching causes dissipation of energy associated with the leakage inductance of the coils in addition to the switching losses of the devices. Control of the motor speed and torque can be implemented by operation of the armature switches for a length of time within each armature conduction cycle; the length of time being determined by load requirements and the speed of the rotor as described in PCT/GB00/03197.

The method illustrated in FIG. 8 must therefore be adapted to be suitable for use at higher speed where repetitive pwm is no longer appropriate. Furthermore, as the speed of the rotor increases a method based on sampling the gradient of the field current would lead to inaccuracy in the detection of the exact point at which the gradient changes sign, the inaccuracy being related to the decreasing ratio of the sample frequency relative to the rotational frequency of the motor. Since the state of the switches is not changing to implement pwm current or voltage control, any change in state of the gradient of the field current which occurs, either during the time when a switch is on, or during the time when the switch is off, is due purely to the change in coupling between the field and armature windings.

The method of operation of the invention in high speed modes where the armature switches associated with each polarity of armature current remain in conduction for a portion of the armature conduction cycle can be described with reference to FIG. 14. The change in state of the gradient of the field current can occur and be detected during either the on time or the off time of the armature switches in the inverter.

Figure 14:
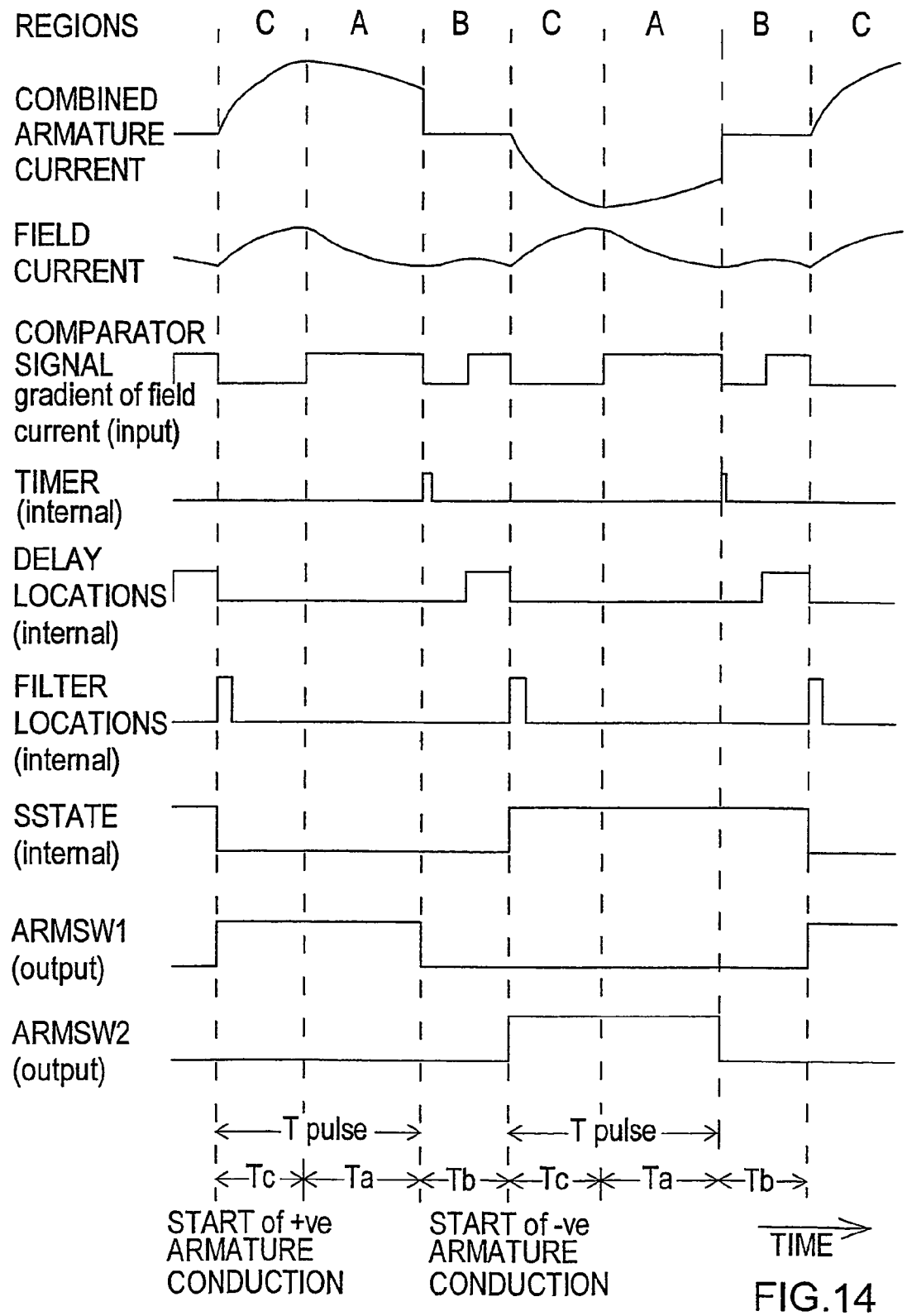
FIG. 14 shows the timing of armature control pulses and the information obtained from the change of sign of the gradient of the field current which is used to synchronise the timing of the armature control pulses to the position of the rotor.

FIG. 14 shows the sequence of events over a typical armature conduction cycle. At the start of FIG. 14 the signal ARMSW1 is high. This indicates that $S_1$ in FIGS. 7a and b, is on (or switches $S_1$ and $S_3$ in FIG. 6a or 6b) and a positive voltage is applied to the armature winding and the effective (combined) armature current is positive. The application of a positive voltage to the armature winding induces a voltage within the field winding of the motor. As the motor rotates that mutually induced voltage changes from positive to negative causing the superimposed gradient of the field current to change from positive to negative.

At a point during the positive armature conduction block the gradient of the field current will change from positive to negative shown by a rising edge of the comparator signal. The time of this change in state is recorded by a microcontroller or equivalent electronic circuit and the time elapsed since the positive voltage was first applied to the armature is calculated, $T_c$ in FIG. 14 (the duration of region C).

The remaining time, $T_a$, for the ARSW1 signal to remain high can now be calculated, (the duration of Region A). $T_a = T_{pulse} - T_c$, where $T_{pulse}$ is the duration of the pulse which may be calculated according to PCT/GB00/03197 or any equivalent means or may be a fixed percentage of the armature repetition cycle.

After $T_a$ has elapsed, ARMSW1 is taken low to turn off the armature switch(es) and Region B is started. If the time for each half cycle of armature excitation cycle time (time for 45 rotation in a motor with 8 stator poles and 4 rotor poles) is $T_{half-cycle}$, the time for Region B. $T_b$, can be calculated from $T_b = T_{half-cycle} - T_{pulse}$.

At the end of region B the opposite armature switch signal, ARMSW2, is taken to high to turn on the opposite armature switch(es) and apply negative voltage to the armature windings and create the negative armature current necessary for a complete cycle of operation of the motor.

As an alternative or additional method of synchronisation the comparator describing the sign of the gradient of the field current can be monitored during Region B. During the Region B following the positive armature conduction block, the voltage applied to the armature is negative. Since Region B is occurring in the latter part of an armature conduction half cycle, the gradient of the field current will be positive after the switch(es) are turned off and the comparator signal will be low.

During Region B a change in the sign of the gradient from positive to negative indicates that the rotor has turned through a sufficient angle to have reached a point where a negative applied armature voltage is producing a negative gradient of field current. This is a clear indication of the rotor angle at which the negative armature conduction block could start. The armature circuit could be energised again with the opposite polarity of current. Detection of the change in gradient from positive to negative (low high in the comparator in FIG. 14) during the time when the switch is off can therefore be used to synchronise the point of beginning the armature conduction of the opposite polarity. It will not always be necessary to begin the armature conduction of the opposite polarity immediately on detecting this transition. If $T_{pulse}$ is small relative to the expected time for each half cycle, $T_{half-cycle}$, then a delay can be inserted as shown in FIG. 14. If $T_{pulse}$ is large relative to the expected time for each half cycle, $T_{half-cycle}$ as occurs under full load conditions, the delay at this point will be minimal.

Also shown in FIG. 14 is a signal called filter locations. It is advisable that for a period of time after a switch is turned on that the comparator signal is not monitored as spurious transitions in the differentiated signal can occur after switching. Similar filtering can be applied after turn off of the switch (start of region B).

It may be advantageous in some implementations to produce an internal signal within a controller which changes state with each armature reversal. This signal, Sstate in FIG. 14, is identical to the signal normally present in a machine with a conventional sensor.

As the motor accelerates different algorithms are used to calculate the pulse at each speed. The speed of the motor is available to the controller and is derived by the summation of the times of region A, B and C. A closed loop speed control system can easily be implemented by comparing this time to a target time for each half cycle and producing a larger or smaller pulse during the next half cycle to correct any error in the measured speed.

In some implementations there may be times when there is a change in the gradient of the field current due to an effect other than the mutually induced voltage applied to the armature windings.

For example, if there is a sudden increase in the percentage excitation applied to the armature winding of a series flux switching motor, this will be accompanied by an increase in the field current.

As a further example, if the dc voltage applied to the power electronic circuits of FIG. 5, 6 or 7 is derived from a rectified ac supply with minimal smoothing capacitance, the voltage across the power electronic circuits will vary in the profile of a rectified sine wave. The current profile in the armature and field windings will vary to follow this rectified sine wave. As the voltage rises from zero the rate of change of current in the field winding will have an average positive value. The mutually induced voltage in the field winding due to the excitation of the armature windings creates additional changes in the gradient of the field current superimposed on this average positive value of the gradient of the field current. The mutually induced electrical signal representative of the rotational position of the rotor is still present but may be masked by the longer term average of the gradient of the field current such that the gradient of the field current does not change polarity at all during an armature conduction cycle. Therefore to allow the mutually induced electrical signal representative of the rotational position of the rotor to be clearly detected, the effect of the long term average of the gradient of the current need to be removed from the differential of the current waveform.

The operation of the position sensing means under such circumstances can proceed in several ways and two such methods will be explained here for illustration.

The differentiated signal derived from the field winding current contains the mutually induced electrical signal representative of the rotational position of the rotor but also contains any variations in the average excitation level of the machine. The variations in the average excitation level of the machine will usually be at a low frequency relative to the variation in the mutual inductance. A first method would be to filter the signal representing the differentiated field current before it is applied to the comparator. Such a filter would be a high pass or band pass filter to allow to signal containing the mutual induced electrical signal to pass while removing the signal due to the slower variation in the average excitation of the machine. The output of the filter can then be passed to a comparator as before and compared with zero to determine if the mutually induced electrical signal was positive or negative and hence to determine the rotational position of the rotor.

The implementation of a high pass filter is generally more difficult than a low pass filter. A second method would use a low pass filter of the electrical signal which would produce a signal representing the component of the gradient of the field current which is representative of the rate of change of the average excitation of the motor. This signal is applied to the reference pin of the comparator. The electrical signal containing the mutually induced electrical signal representative of the rotational position of the rotor and the variation in the average excitation level of the machine is then compared to this non zero reference. This method is particularly beneficial when operating the machine from a dc voltage which is derived from rectification of an ac supply with minimal voltage smoothing.

Figure 26:
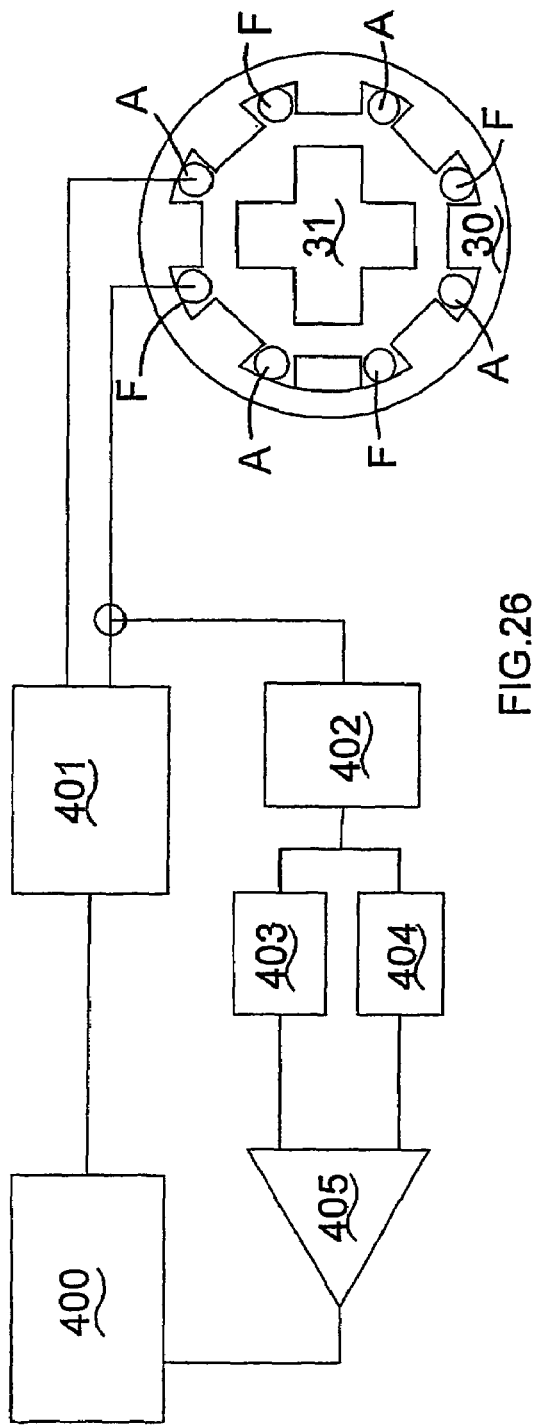
FIG. 26 is a block diagram of an embodiment of the invention.

One complete implementation of the invention is illustrated by FIG. 26. An electrical machine with stator 30 and rotor 31 has a field windings F and armature windings A energized by a suitable power electronic controller 401. A controller 400 sends signals to the power electronic controller 401 to control the armature current to achieve the desired operation of the machine.

When the machine is operating as a motor, the armature windings A will be supplied with electrical current from the power electronic controller by the application of applied voltage in synchronism with the rotation of the rotor 31. A mutually induced first electrical signal dependent on rotational position of the rotor will be induced within the field windings F. This will create a superimposed gradient in the field current delivered by the power electronic controller 401. The mutually induced first electrical signal can be extracted from the field current by block 402 which may be a differentiator circuit or may be a coil coupled to the magnetic field around the field current conductor. The output of 402 represents the magnitude of the mutually induced first electrical signal. Block 403 is an optional signal conditioning circuit which may contain a filter circuit. Block 404 creates a reference voltage for the comparator 405. The reference voltage can be zero such that the comparator 405 determines the polarity of the mutually induced first electrical signal. The output from the comparator is a digital signal indicating if the mutually induced first electrical signal is less than or greater than the threshold applied by block 404. This comparator output, a second electrical signal, represents the rotational position of the rotor relative to the stator and is supplied to the controller 400 to maintain synchronism between the armature excitation and the rotor position. The controller 400 may be a microcontroller or an application specific integrated circuit or any other appropriate electronic circuit.

In an improved implementation described above block 404 implements a low pass filter to create the reference from an average value of the mutually induced first electrical signal. This is applied to one input of the comparator. In this case block 403 may pass the mutually induced first electrical signal directly to the comparator without any filtering.

These minor variations to the basic methods ensure that the methods described have the best opportunity of accurately detecting the point at which the mutually induced electrical signal changes polarity.

Initialisation and Starting the Motor

At low speed FIG. 8 showed that the change of polarity of the gradient of the field current occurred approximately half a stator pole pitch away from the ideal point of armature current reversal. Once the motor is rotating this information can be used to estimate the position for the reversal of the armature current to maintain torque in the same direction. However, when the motor is stationary the information available is not on its own sufficient to determine the polarity of armature current which will produce torque to start the motor in the required direction.

A new procedure incorporating a further embodiment of the invention allows successful starting of the motor. At starting, position information can be found by pulsing one winding of the motor e.g. the armature winding. The voltage induced in the other winding e.g. the field winding creates a variation in the current flowing in the second winding which can be detected to obtain some information about rotor position.

Figure 15:
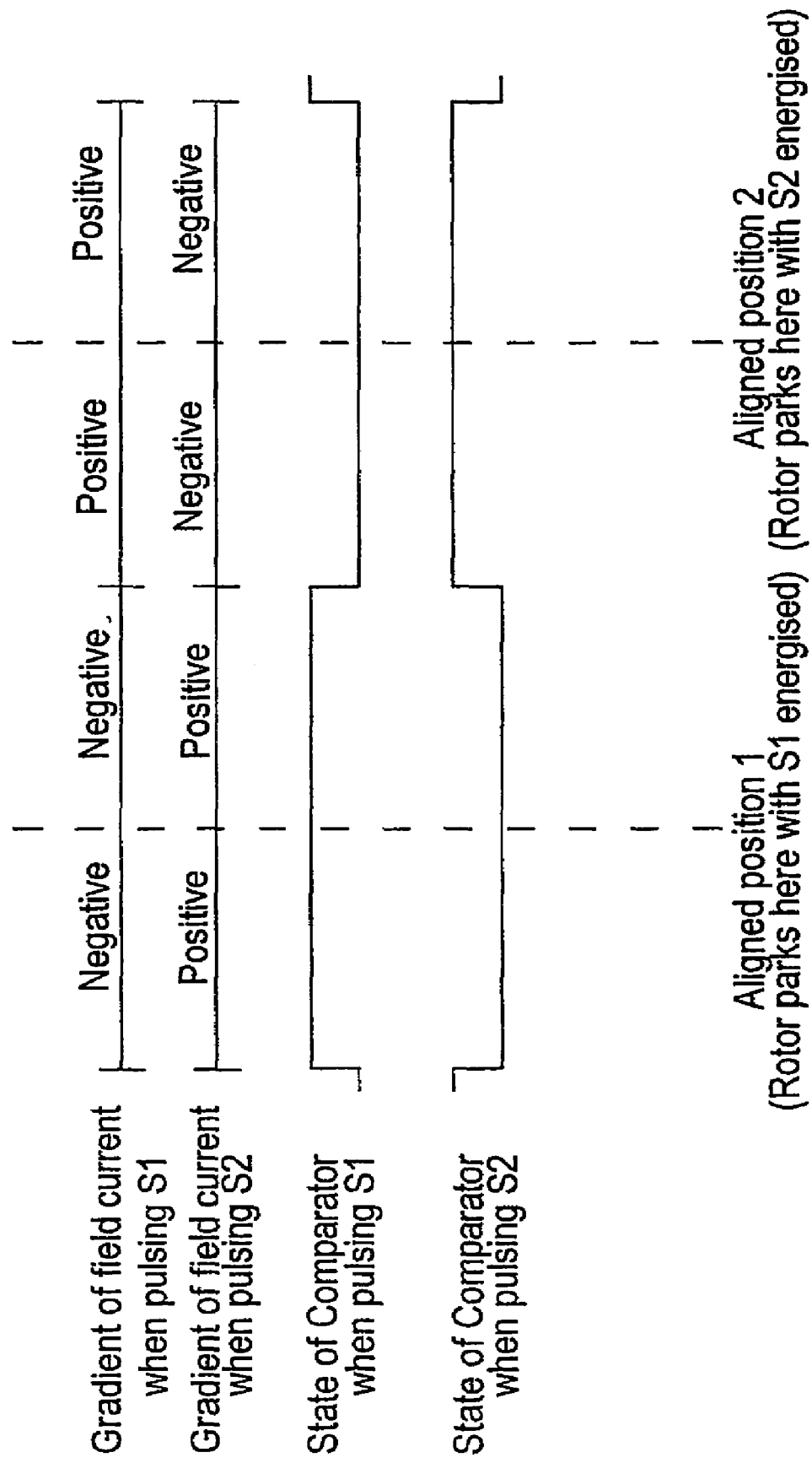
FIG. 15 shows the information obtained from pulsing a winding (the armature winding) of the motor at standstill and monitoring the gradient of the current in another winding (the field winding)

FIG. 15 shows the position information available from this method. If $S_1$ (and $S_3$ if a full bridge inverter) is turned on for a short period of time, a positive voltage will be applied to the armature winding. The current in the armature winding will increase. However, the current in the field winding will increase or decrease depending on the orientation of the rotor and the degree of magnetic coupling between the armature and the field winding. FIG. 15 shows two positions a stator pole pitch apart (45° in the 8/4 motor) where the poles of the rotor are aligned with stator poles. Aligned Position 1 is the position of stable equilibrium for the rotor when the current in the field winding and the armature winding are both positive (aligned position with $S_1$ energised (and $S_3$ if present)). Aligned Position 2 is the position of stable equilibrium for the rotor when the current in the field winding is positive but the current in the armature winding is negative (aligned position with $S_2$ energised (and $S_4$ if present)). For approximately 22.5° (in an 8/4 motor) either side of Aligned Position 1 applying a short pulse to $S_1$ applies a positive voltage to the armature and produces a negative gradient in the field current. In the configuration used in the earlier description of the comparator this will produce a high value in the comparator. In this same region pulsing $S_2$ will produce a positive increase in the field current and a low value of comparator as shown in FIG. 15.

Applying a voltage of either polarity to the armature winding can be used in conjunction with the information shown in FIG. 15 to determine which of the two aligned positions the rotor is closer to.

With this information it is useful to classify the rotor as being either in Region 1 or Region 2. If the rotor is in Region 1, energisation of $S_1$ (and $S_3$ if a full bridge inverter) will produce positive armature current and a torque which will act to pull the rotor towards the Aligned Position 1 of Region 1. This may involve rotation in either direction but it is guaranteed to be the shortest angular distance to an aligned position.

Providing the machine has some known stator or rotor asymmetry, energisation of the armature with the opposite current polarity will create a torque to pull the rotor out of the Aligned Position 1 of Region 1 in a known direction. (It is usual in a flux switching motor or switched reluctance motor with twice the number of stator poles as rotor poles that the rotor has asymmetry to guarantee starting torque from aligned positions in the required direction Subsequently the next reversal in the gradient of field current will be detected midway to the next aligned position and used to predict the point to reverse the armature current polarity again.

An earlier patent application (PCT/GB00/03213) described a procedure for starting a motor in which an initial armature excitation pulse is extended in length to establish the flow of field current and is followed up with pwm at a reduced duty ratio. Starting of the motor with the above embodiment of the invention without a mechanical sensor can be achieved while also satisfying the starting procedure for a series flux switching motor as implemented in PCT/GB00/03213. This procedure is now described.

No position information is available to the sensorless controller until the motor is energised with one polarity of armature current. The initial choice of armature current polarity does not matter. The initial pulse is of a duration sufficient to establish the field current. Detection of the field current and its gradient during the initial pulse is difficult because the effect of the voltage induced from the armature into the field is masked by the large positive rate of change of current associated with the initialisation of field current.

The gradient of the field current during a subsequent pwm pulse of either voltage polarity gives clearer position dependent information. In such a subsequent pwm pulse the information given in FIG. 14 can then be used to determine the rotor position within one of the two regions.

In the region 1, the rotor is closest to Aligned Position 1, positive armature current will move the rotor forwards or backwards by no more than one quarter of a rotor pitch, towards the stable equilibrium point for positive armature current. After an appropriate time changing the excitation to negative will pull the rotor away from the stable equilibrium point in a known direction of rotation determined by any asymmetry in the stator and rotor lamination design. All subsequent commutation points can be calculated from sensorless data as described with reference to FIG. 8.

In the region 2, the rotor is closest to the Aligned Position 2, negative armature current will move the rotor forwards or backwards towards the stable equilibrium point for negative armature current. After an appropriate time changing the excitation to positive will pull the rotor away from the stable equilibrium point in a known direction of rotation.

It is not necessary to arrange for the rotor to be completely stationary in the static equilibrium position before current reversal takes place. This is because if the rotor is moving towards the aligned position of the region in a forward direction, current reversal can take place before the rotor becomes stationary and the rotor inertia will help to keep the rotor spinning in the required direction. Conversely if the rotor has to be pulled backwards towards the aligned position of the respective region there is no harm in early reversal of the current as the torque produced will be in the correct direction. The appropriate length of time for the change in excitation to occur from the initial polarity determined by the initial region selection to the polarity required for torque production in a known direction will depend on lamination design, static load torque, rotor inertia, supply voltage, pwm duty ratio, stator winding impedances etc. This time can be optimized empirically or determined from a mathematical model of the electrical and mechanical system.

It should be noted that stator asymmetry in the flux switching motor (PCT GB00/02439) may make one region slightly wider than the other region but does not affect the principle of the invention. The method can be easily adapted to provide rotation in a direction opposite to the direction for which the asymmetry has been designed by moving the rotor initially in the known starting direction and then initiating a reversal of direction.

Transition from Low Speed (pwm) to High Speed (Single Pulse)

Figure 16:
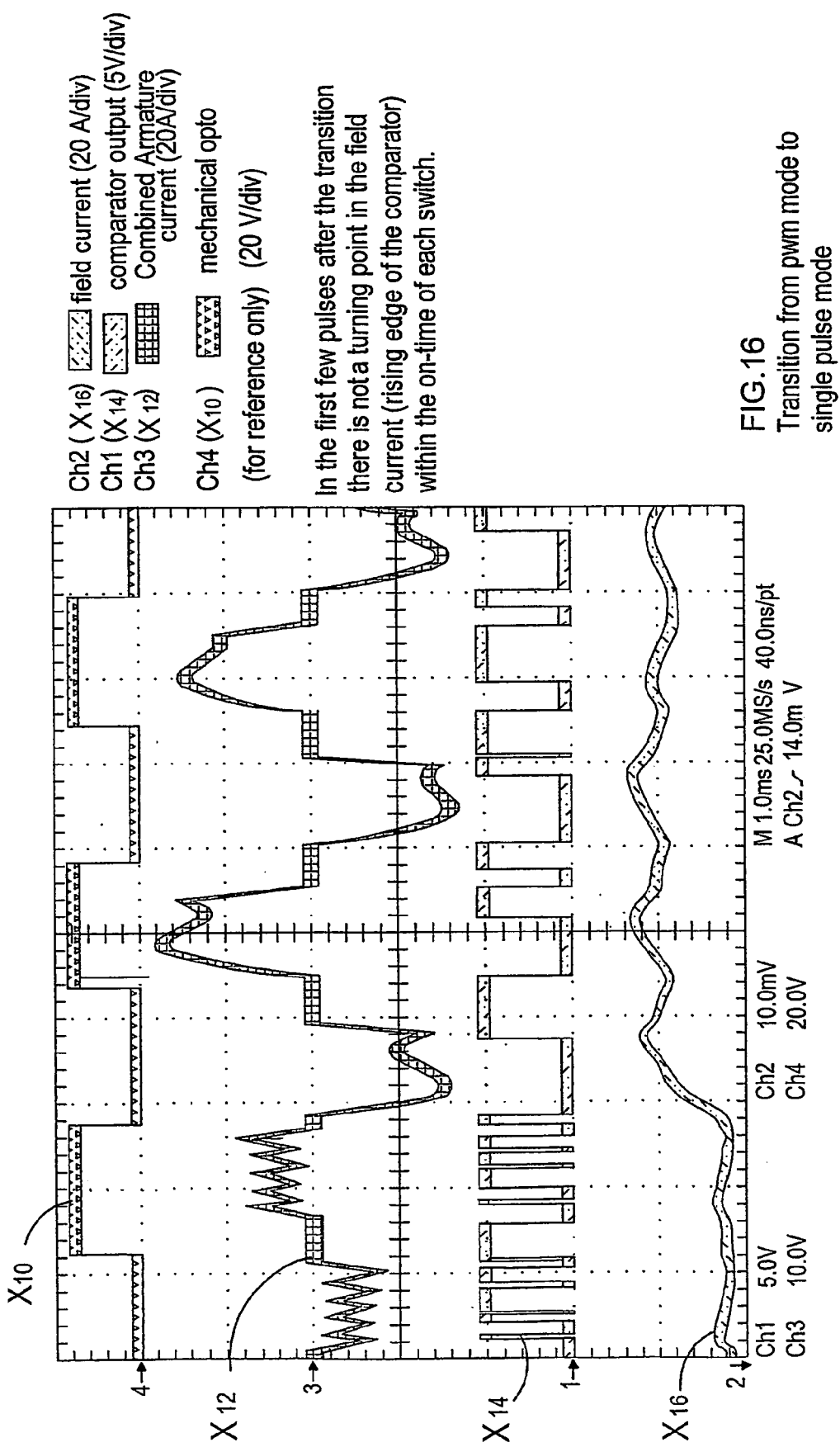
FIG. 16 shows an experimental waveform illustrating an embodiment of the invention applied during the transition from pwm operation to single pulse.

During the transition from a low speed pwm controlled mode to a high speed single pulse routine there may be a steep increase in the average level of the field current. This large increase in the field current masks the internal induced voltages due to the variation in armature coupling. The normal differentiator/comparator arrangement may not therefore detect a change in polarity of the gradient of the field current during the on-time of the switch. This can be seen in the experimental waveforms shown in FIG. 16 during the first three armature pulses after entering single pulse mode. In FIG. 16 the trace $X_{10}$ is a mechanical sensor on the shaft of the motor shown for reference only, trace $X_{12}$ is the combined armature current (20 A/div); trace $X_{14}$ is the electrical output signal from a comparator produced by comparing the differentiated field current signal to a zero reference; trace $X_{16}$ is the field current (20 A/div). The comparator rising edge is not present during the on time of the switches in the first and third armature current pulse after the end of the pwm chopping.

An embodiment of the invention allows for the selection of switching times for the positive and negative cycles of the armature to be pre-calculated from the knowledge of the rotor position and speed just prior to the transition from pwm to single pulse mode. Driving the motor in an apparently open loop manner for a number of armature pulses gives the field current transition time to settle out and normal comparator single pulse operation (as in FIG. 14) to be restored. This transition is shown in FIG. 16.

If the decision to enter the single pulse routine is based on a number of pwm cycles within an armature conduction block there can be a variation in the actual speed at which the transition is initiated. A system of driving the motor open loop for over half a revolution using pre-calculated switching times can therefore be subject to error.

To improve the stability of the transition a further embodiment of the invention can be employed. In this further embodiment of the invention the position of the start and finish of the application of voltage to the winding with respect to rotor position can be altered by monitoring the relative time periods of positive and/or negative gradient of a winding current during any part of the machine rotation.

In one implementation of this embodiment the fourth pulse after the transition is monitored to implement an adaptive pulse position algorithm. The time from the turn on of a switch to initiate the fourth armature conduction block after the transition from pwm to the rising edge of the comparator gives a measure of the position of the pulse. This time is shown by the cursors in FIG. 17(a) trace $X_{20}$ is a mechanical sensor on the shaft of the motor shown for reference only, trace $X_{22}$ is the combined armature current (20 A/div); trace $X_{24}$ is the electrical output signal from a comparator produced by comparing the differentiated field current signal to a zero reference; trace $X_{26}$ is the field current (20 A/div). Traces $X_{28} X_{30}$, $X_{32}$, $X_{34}$ are detailed views of $X_{20}$, $X_{22}$, $X_{24}$, $X_{26}$ expanded in the horizontal axis for clearer viewing of the fourth armature current pulse after entering single pulse operation.

In one specific example where the transition to single pulse was occurring at a speed of approximately 5000 r/min, the period of a complete cycle of armature excitation in a motor with 8 stator teeth and 4 rotor teeth (positive and negative armature conduction blocks) is 3 ms at this speed. One example of this embodiment of the invention measures the time from the application of positive voltage to the armature to the rising edge of the comparator (the point at which the gradient of the field current changes from positive to negative). This time is the time defined as $T_c$ in FIG. 14. In this example at this speed, if the time, $T_c$, is less than 750 μs (50% of the time taken to for the rotor to rotate 45 degrees), then the off time before the next switch comes on (the next $T_b$) to initiate the fifth pulse is set to 1.5 times the measured value of $T_c$. This is shown by the cursors in FIG. 17(a) where the measured time from the initiation of the fourth pulse to the rising edge of the comparator was only 304 ms FIG. 17b shows that the time from the turn off of the fourth pulse to the turn on point of the fifth pulse is set to 1.5 times $T_c$ i.e. 456 μs.

If the time, $T_c$, measured in the fourth pulse had been greater than 750 μs then the off time before the next switch comes on would be set to the same value as the measured time i.e. $T_b = T_c$.

The value quoted in this example of 750 μs corresponds to approximately one half of the armature conduction block. It is preferable therefore to make adjustments to the pulse ensure that the value of $T_c$ is less than 50% of the duration of an armature half cycle and preferably $T_c$ should be in the range 20%-40% of the armature half cycle. However if the time of the armature voltage pulse ($T_{pulse}$) is less than 50% of $T_{half-cycle}$, the value of $T_c$ may preferably be allowed to be lower than 20% of $T_{half-cycle}$.

It was found that the implementation of this algorithm greatly improved the positioning of the fifth pulse to cope with the variation in speeds at which the single pulse routine is entered.

Adaptive Pulse Repositioning in Single Pulse Routine

Figure 18:
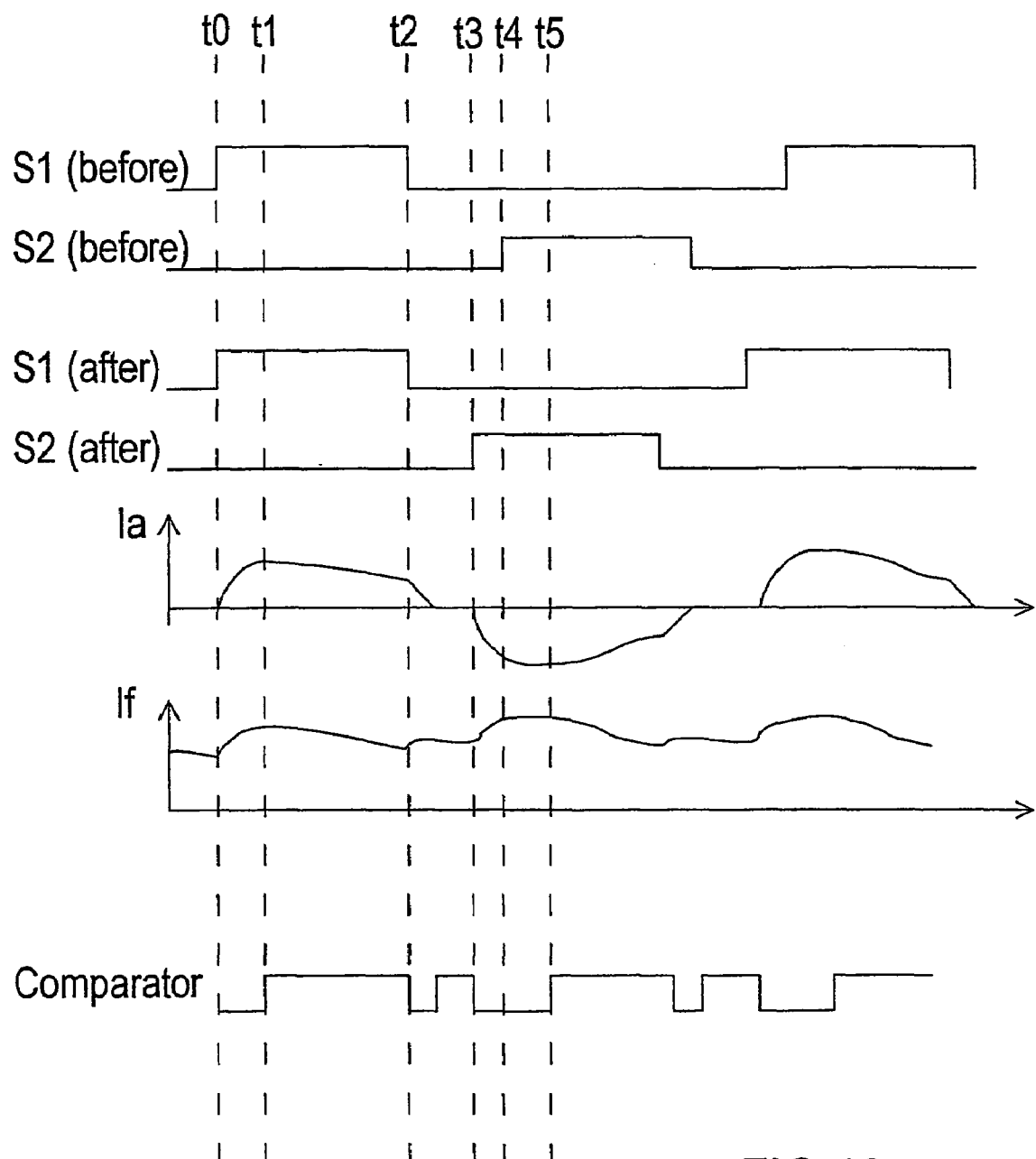
FIG. 18 shows the critical times which are involved in adaptive pulse positioning.

In some cases, particularly where gradient information is not available during the off time of the armature switches the turn on point of the armature switches may be earlier or later than ideal. The non-ideal turn on point of the armature current can be detected from the length of time, $T_c$, taken from the turn on of the switch to the peak of the field current trace. This is shown in FIG. 18 as the time $t_0$ to $t_1$ and was defined in FIG. 14 as $T_c$.

If the armature current turn on point is later than ideal the time $T_c$ will become a smaller proportion of $T_{pulse}$ where $T_{pulse}$ is the time during which positive or negative voltage is applied to the armature during an armature conduction block ($t_2 - t_0$ in FIG. 18). This time can be measured by an appropriate electronic circuit or by a timer in a microcontroller. The measured value of $t_1 - t_0$ can be used to calculate a better position for the next armature excitation pulse such that the excitation of $S_2$ is initiated at $t_3$ rather than at $t_4$. The earlier turn on point moves the armature conduction block closer to the ideal torque producing region. Once this adjustment has been made the time $t_5 - t_3$ ($T_c$ in the next pulse) is again a more appropriate portion of the time $T_{pulse}$.

Figure 19:
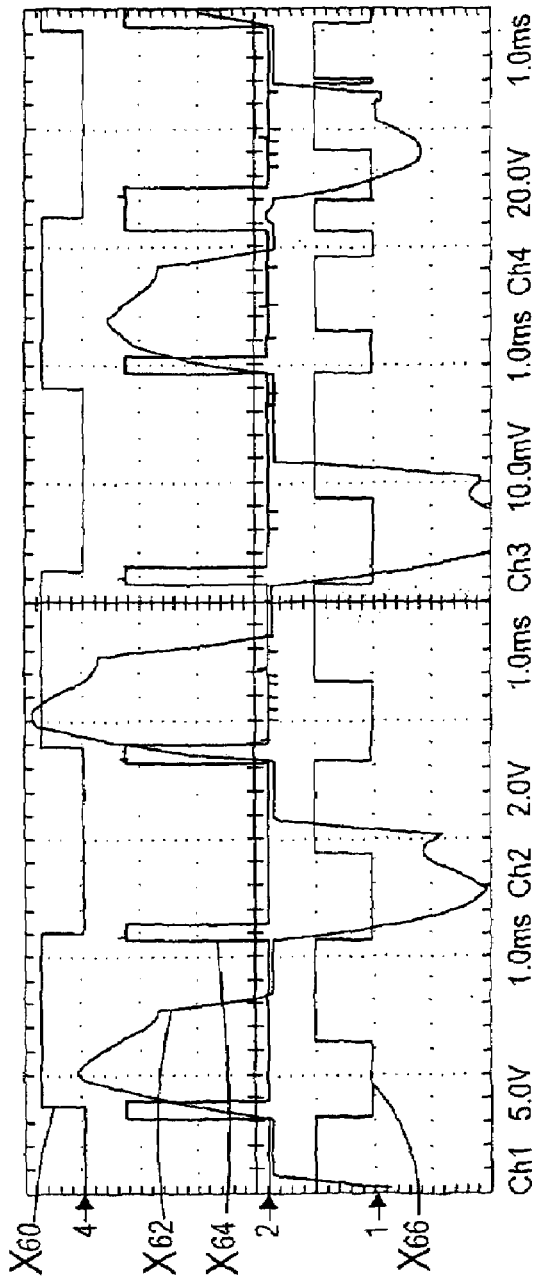
FIG. 19 shows a further implementation of an embodiment of the invention for adaptive pulse positioning.

FIG. 19 shows the implementation of this algorithm to correct armature excitation pulses which were occurring earlier than is ideal. In FIG. 19 trace $X_{60}$ is a mechanical sensor on the shaft of the motor shown for reference only, trace $X_{62}$ is the combined armature current (20 A/div); trace $X_{64}$ is a digital output of the microcontroller showing the location of timer interrupts initiating the start of each armature conduction pulse; trace $X_{66}$ is the electrical output signal from a comparator produced by comparing the differentated field current signal to a zero reference. Two positive and two negative armature pulses which have been positioned by timers in the absence of a comparator rising edge during the off time between armature pulses.

If a valid rising edge comparator signal is not detected during the off time of several successive pulses it can be assumed that the pulse position is not ideal. The time, $T_c$, is measured (just past the middle of the zoom window in FIG. 19). The next off time ($T_b$) is then calculated as 1.25 $T_c$ which repositions the next armature current pulse, reducing the current drawn and immediately re-establishes the comparator edge during the off time.

Subsequently if four armature half cycles occur without an off time comparator the re-positioning algorithm can be implemented again.

The repositioning algorithms described so far employ pre-calculated adjustments to the pulse position to ensure that the position of the pulse is moved to a position such that the comparator signal during the off time of the switches is allowed to re-occur. In some machines the off-time comparator signal may not occur frequently enough to be relied upon for synchronisation of the pulse position. This may occur in the following circumstances:

1. In some power electronic circuit implementations, the capacitor in FIGS. 6a and 7a may not be present to reduce the cost of the drive. This alters the shape of the field current waveform particularly in single pulse mode and the comparator signal during the off-time of the switches is less consistent and sometimes not present at all.

2. In some power electronic circuit implementations it is beneficial to remove the diode in FIGS. 6a and 7a to allow for voltage boosting of the armature voltage at high speeds. This alters the shape of the field current waveform particularly in single pulse mode and the changes in gradient of the field current during the off-time of the armature switching circuit are masked by the larger negative field winding voltage during the off time of the armature current.
3. When the armature pulse in a flux switching motor approaches 100% of the available time the comparator edge during off time used to synchronise the turn on of the next armature pulse disappears.
4. Flux switching motors which are designed to run with a diode permanently connected to the field winding have a reduced turns ratio between the field and armature. This means that the voltage induced in the field due to armature switching is lower and the changes in superimposed gradient of the field current can be more difficult to detect, particularly during the times when the switches are off.

The re-positioning algorithms described so far also employ specific timings to shift the position of the pulse. These timings are not generally applicable across the speed range of the machine and are therefore limited to specific speeds. An improved embodiment of the invention allows pulse repositioning to occur continually to adjust the position of the armature pulse in every operating cycle for optimal synchronisation with the rotor position.

The relative duration of $T_{pulse}$ relative to $T_{half-cycle}$ ($T_{half-cycle}$ (=$T_a+T_b+T_c$) and $T_{pulse}$ were defined with respect to FIG. 14) at a given speed is always dependent on the torque required by the load to maintain a desired load characteristic or maintain the current speed. This further embodiment uses the fact that for the best torque production the position of the armature excitation pulse relative to the rotor position should be continually adjusted so that the time $T_c$, from the turn on of an armature switch to the turning point of the field current should be maintained in the range 15% to 65% of $T_{pulse}$ and preferably in the range 25% to 55% of $T_{pulse}$. This can be achieved by measurement of $T_c$ and then calculating the value of the next $T_b$ to adjust the start position of the next pulse to be earlier or later than the measured pulse.

The turning point in the field current which occurs during the on-time of the switch is not a fixed position relative to the rotor but depends on:
(i) The circuit topology and component values;
(ii) The turns ratio between the field and armature;
(iii) The motor speed;
(iv) The turn on point;
(v) The previous turn off point;
(vi) The average level of the excitation at the particular load and speed;

As a result the change in gradient of the field current does not occur at an absolute position and cannot therefore in itself be used to directly synchronise the switching of the armature switches. However, despite all of the above dependencies of the position of the turning point, optimal torque production can be maintained at any operating point by maintaining the turning point of the field current at a particular proportion of the applied armature pulse width.

Figure 24:
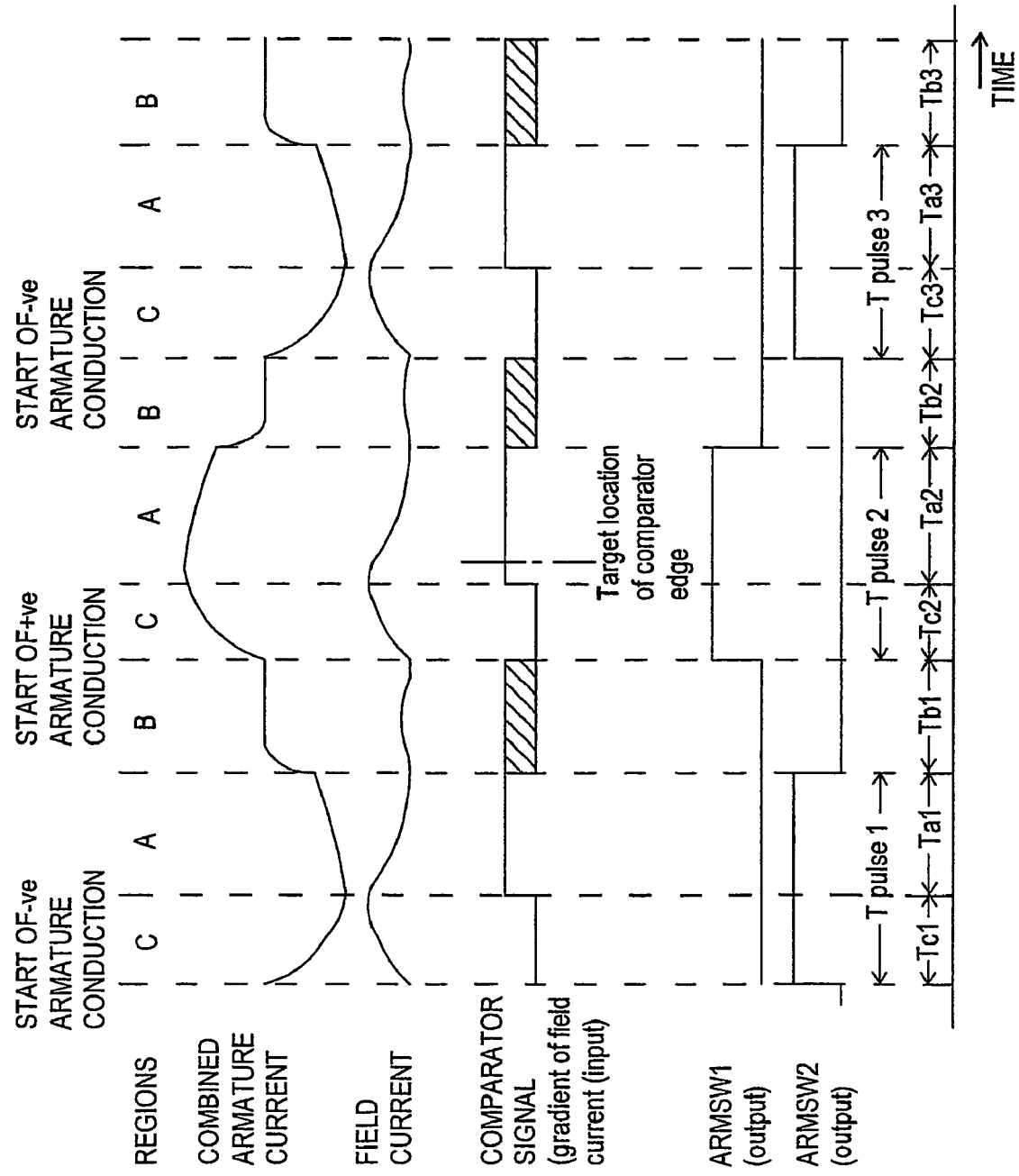
FIG. 24 shows a further implementation of the timing of armature control pulses and the information obtained from the change of sign of the gradient of the field current which is used to synchronise the timing of the armature control pulses to the position of the rotor.

In one illustration of the method shown in FIG. 24 it is preferred that the turning point of the field current should occur x %, which may be between 25% and 65%, and is more preferably between 35% and 55% of the way through each respective armature switch on time. In FIG. 24 the first armature pulse, is associated with negative armature current and is controlled by the signal ARMSW2 energising $S_2$ (and $S_1$ if a full bridge inverter). The length of the first armature pulse is Tpulse1, where Tpulse1 is calculated as the length required to maintain the desired speed or deliver the required torque at the current speed. At the end of the pulse, Tpulse1, the signal ARMSW2 goes low for a time Tb1, de-energising the armature winding. The time Tb1 was calculated as will be described below for Tb2. At the end of Tb1, ARMSW1 goes high, initiating the energisation of the armature with positive current. The time taken from the point of turning on an armature switch to the turning point of the field current ($T_{c2}$ in FIG. 24) is measured by the microcontroller or other appropriate circuit.

This is compared to the target value of x % of the present armature pulse duration. The target value for the length of Region C is shown on the diagram as the dashed line just after the actual occurrence of the turning point of the field current. In the example shown in FIG. 24, the measured value Tc2 is less than the target value. The difference between the measured value Tc2 and the target value for $T_c$ generates an error signal.

$$\text{error} = T_{c2} - \left(\frac{x}{100}\right)T_{pulse}$$

In the case shown in FIG. 24 this error is a negative number since Tc2 was less than the target value. The fact that this error is a negative number indicates that the pulse position relative to rotor position was too late for optimal torque production. The error is used to adjust the value of the next off time, Tb2, to deliver a pulse of more optimal position relative to rotor position.

The error signal is used in a PID controller to modify the duration of the off time between armature pulses so that the position of the next armature pulse is closer to the target value. The implementation with proportional only term would be as follows:

$T_{b2}$=Calculated $T_b$ before correction+$K_p$(error)

$T_{b2}=T_{a1}+T_{b1}+T_{c1}-T_{pulse2}+K_P$(error)

The value $K_P$ is the proportional gain in a proportional control loop. Its value controls the rate at which the system will converge on a stable solution. If $K_P$ is too high instability may result. A value in the region of unity will usually be acceptable for typical applications. The controller may be further improved by using the integral and derivative of the error as will be known to those skilled in the art.

FIG. 24 shows that the length of Tb2 is shorter than Tb1 due to the negative sign of the error. The position of Tpulse3 is therefore brought forward relative to rotor position and the value of Tc3 is then close to the target value for Tc.

It can be appreciated that if the position of the change in the polarity of the gradient is later than the target value for Tc, this is an indication that the present pulse occurred too early relative to the position of the rotor: the error generated will be positive and the calculated value of the next Tb will be greater than it would otherwise be thus shifting the position of the pulse relative to the rotor of the machine.

During the calculation of each Tb following the measurement of Tc it is also important to recalculate the current time for an electrical half cycle of the motor, $T_{half-cycle}$, as this allows the speed of the machine to be accurately monitored at all times. This ensures that the length of the next pulse and its target value for Tc are up to date with the present speed of the motor.

Figure 13:
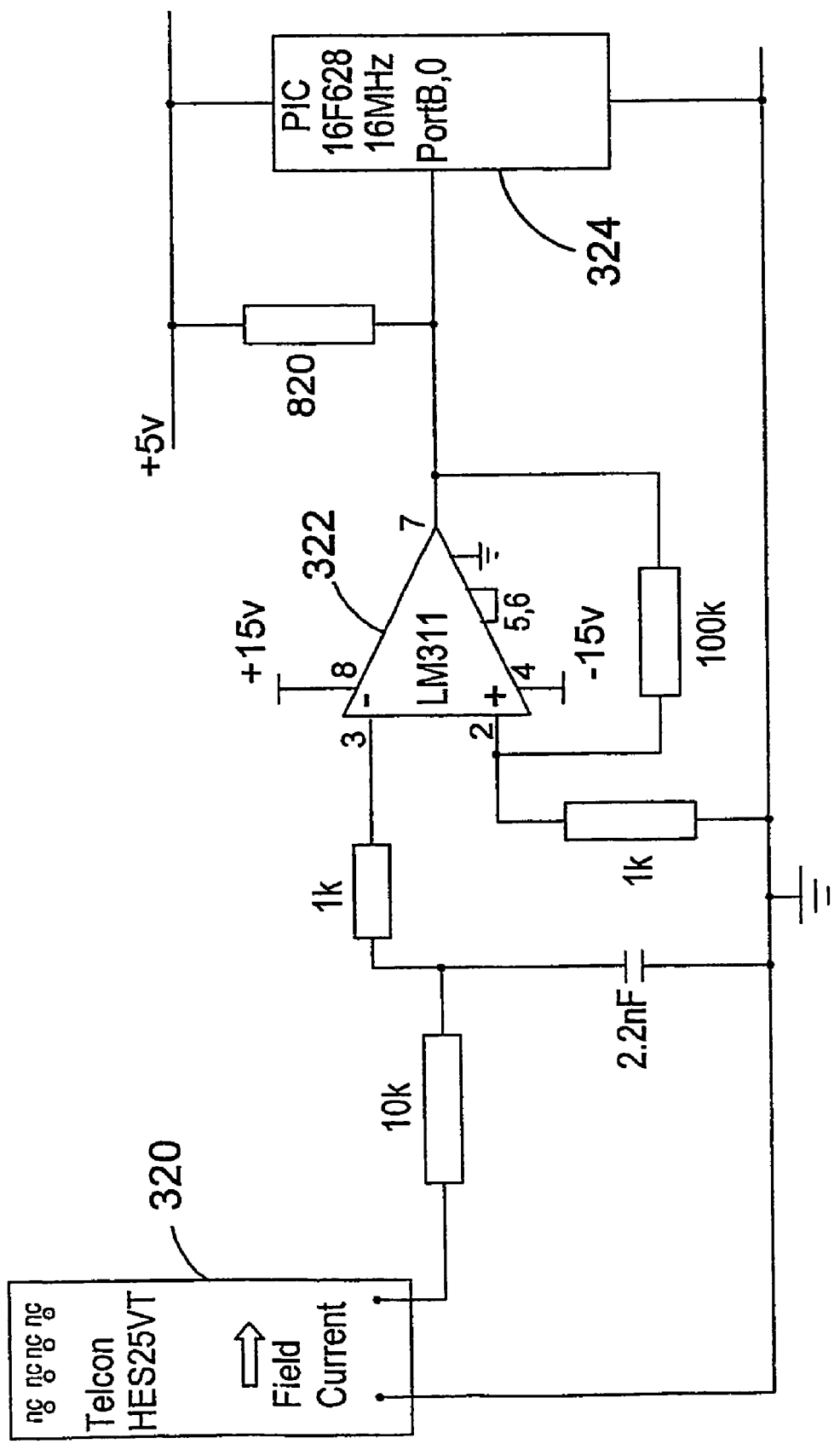
FIG. 13 shows a variation on the circuit of FIG. 12.

Since this method is not dependent on detecting a change in state in the gradient of the monitored current during the off time of the switch, it may be preferable to apply some additional analogue filtering to the detection circuit which was illustrated in FIG. 12. This modification is shown in FIG. 13. The resistor (10 k) and the capacitor (2.2 nF) inserted between the coil 320 and the comparator 322 form a low pass filter which can be chosen to remove much of the high frequency content of the gradient detection circuitry. This circuit offers improved immunity to noise over the circuit shown in FIG. 12 but does tend to remove most of the gradient information during the off-time of the switches. As a result it should only be used in conjunction with an implementation of the invention which is not dependent on measurement of the gradient during the off-time of the switches.

The procedure of this method has been implemented in conjunction with FIG. 13 and is illustrated by the oscilloscope plots in FIG. 20(a) and (b) in which:

Trace $X_{70}$ Field current 5 A/div

Trace $X_{72}$ input to microcontroller representing the sign of the gradient of the field current 5V/div Trace $X_{74}$ One armature switch signal 5V/div Trace $X_{76}$ Combined armature currents 5 A/div Trace $X_{80}$ Field current 5 A/div Trace $X_{82}$ input to microcontroller representing the sign of the gradient of the field current 5V/div Trace $X_{84}$ One armature switch signal 5V/div Trace $X_{86}$ Combined armature currents 5 A/div The time for each armature half cycle, $T_{half-cycle}$ is monitored by the microcontroller. It is beneficial that this time is averaged over several half cycles to produce a stable value. In FIG. 20(a) the time from the start of the armature energisation (rising edge of $X_{74}$) to the rising edge of the comparator $X_{72}$ which would be recorded by the microcontroller is measured illustrated in the plot by oscilloscope cursors to be 956 μs. The controller implemented in this plot was an armature pulse length which was 13/16 (0.8125) of the measured time for the half cycle, i.e. 778 μs.

The target value for the time from the turn on of each armature switch to the next rising edge of the comparator was, in this case, set to $$\frac{9}{32} T_{pulse},$$

so at this particular speed the target value of $T_C$ (the part of the pulse before the comparator rising edge) is $$778 \times \frac{9}{32} = 219 \mu s.$$

In FIG. 20(b), the oscilloscope cursors have been moved to measure the time $T_c$ which actually occurred during the next armature pulse. The measured value of $T_c$ is 220 μs, 1 μs longer than the target value. The error value is therefore set to 1 μs.

$$\text{error} = \text{measured } T_c - \frac{9}{32} T_{pulse} = 220 - 219 = 1 \mu s$$

$$\text{New } T_b = \text{Calculated } T_b + K \text{ (error)} = T_a + T_b + T_c - T_{pulse} + \text{error}$$

$$\text{New } T_b = 956 - 778 + 1 = 179 \mu s$$

The positive error value is added to the calculated value of $T_b$ to create a new value of New $T_b$ which is used to push back the start of the next armature pulse by 1 μs. The slightly later turn on point in the next cycle will act to shorten the value of $T_c$ which will be measured in the next cycle and help to maintain the pulse in the correct position.

The embodiment can be implemented with any pulse size, at any rotor speed and with any target percentage for the time corresponding to $T_c$. In practice it may be advantageous to adjust the target percentage of the pulse with load to maintain optimum efficiency.

The pulse repositioning algorithms can also be used when the motor is operating in pulse width modulation mode. In this case the time Tc is measured by sampling the state of the comparator in each PWM cycle to detect when the state of the comparator changes from the state in the previous pwm cycle. The error calculation and the adjustment of the time Tb between the pulses proceeds as in single pulse mode.

Figure 25:
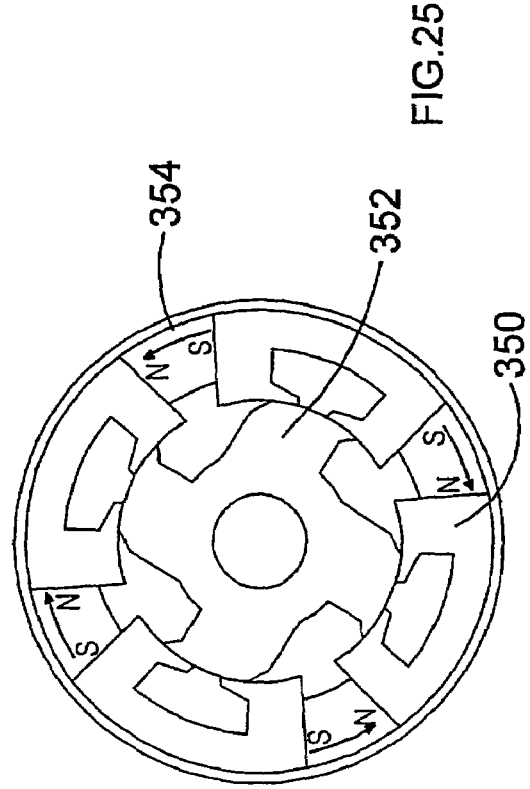
FIG. 25 is a schematic illustration of an alternative embodiment in which the field magnet means is constituted by one or more permanent magnets.

As an alternative to, or in addition to, the field magnet means being constituted by field windings the field magnet means may be a field winding or a permanent magnet. A flux switching machine in which the field magnet means is a permanent magnet is shown in FIG. 25. Four permanent magnets 354 intersperse 4 steel sections 350. The armature windings would be inserted in the slots in the steel sections 350, each armature winding spanning two stator teeth as in FIG. 4. The rotor 352 is similar in form to the rotor of FIG. 4.

Implementation of the invention to produce a position sensing means requires the insertion of an additional electrical winding arranged to have an axis transverse to the axis of an armature winding. The smaller slots 356 adjacent to the permanent magnet sections can be used to carry this additional electrical winding. The additional winding will also have a pitch corresponding to two stator teeth. The additional electrical winding would normally be arranged to couple the flux passing through the permanent magnet section of the stator. As an alternative this can be achieved by placing a small winding co-axial with at least one permanent magnet section of the motor. When a voltage exists on the armature windings a voltage will be induced in this additional electrical winding which will vary according to the mutual magnetic coupling between the armature winding and the additional electrical winding and can be used directly for the position sensing means without the requirement for differentiation. The signal from this additional electrical winding can be applied to the comparator to determine when the mutually induced voltage in the additional electrical winding is positive or negative and therefore determine the rotational position of the rotor.

In a machine in which the field magnet means contains both a permanent magnet and an energized field winding the methods can proceed as previously described. Furthermore an additional electrical winding closely coupled to the field winding can be provided in a flux switching motor which will produce a mutually induced voltage dependent on rotational position of the rotor in a manner similar to the methods already described.

The Complete Circuit Used in Laboratory Tests

One complete embodiment of the invention is shown in the circuit of FIG. 21, in which parts common to the embodiment of FIG. 12 are denoted by like reference numerals and parts common to the embodiment of FIG. 9a are denoted by like reference numerals but increased by 200, and some experimental results obtained from a motor controlled according to the invention is shown in FIGS. 22 and 23 in which FIG. 22 shows results at 1.0 Nm and 1.8 Nm respectively. Whilst FIG. 21 shows the implementation of the inverter configuration of FIG. 7(a) the invention can be equally implemented with the circuits of FIGS. 7b, 6a and 6b.

Trace $X_{90}$ is the electrical output signal from the comparator

Trace $X_{92}$ is the armature current 10 A/div

Trace $X_{94}$ mechanical sensor signal (for reference only) 5V/div

Trace $X_{96}$ timer signals 5V/div

Trace $X_{100}$ is the electrical output signal from the comparator

Trace $X_{102}$ is the armature current 10 A/div

Trace $X_{104}$ mechanical sensor signal (for reference only) 5V/div

Trace $X_{106}$ timer signals 5V/div

Whilst the invention has been described with reference b the armature switches inducing a change in the gradient of the field current it can be seen from the fundamental nature of the technique that it is equally applicable to measure the gradient in the armature current while the excitation of the field is being altered. The field control switch, $S_5$ may be used for this purpose.

In a more advanced control system the sign and magnitude of the rate of change of current in said winding is recorded rather than just the polarity of the sign. The recorded value an be compared to the known (or pre-determined) variation in rate of change of current with position (taking into account rotor speed and current magnitudes). The result of such a comparison would provide data about the position of the rotor in between the positions where the gradient of the said currents changes polarity. Such a system would be more reactive to changes in rotor speed within each armature conduction cycle but would also require more expensive circuitry and would be prone to variations in motor parameters due to temperature and mechanical tolerance.

It will be appreciated by persons skilled in the art that the above embodiments have been described by way of example only, and not in any limitative sense, and that various alterations and modifications are possible without departure from the scope of the invention as defined by the appended claims. In particular, whilst the embodiments described have been specific to an implementation of the invention on a flux switching motor it will be appreciated that the techniques described can be used for the control of a flux switching generator.

The invention claimed is:

1. An electrical machine for converting electrical energy into mechanical energy and/or mechanical energy into electrical energy, the machine comprising:
   a rotor having a plurality of rotor poles;
   a stator for rotatably receiving said rotor and having field magnet means for generating a first magnetomotive force between said rotor and said stator, the stator incorporating at least two electrical windings at least one which is an armature winding adapted to carry electrical current varying in synchronism with rotation of said rotor relative to said stator to generate a varying second magnetomotive force having a component transverse to said first magnetomotive force;
   control means for controlling supply of electrical current to the or each said armature winding; and
   position sensing means for detecting at least one induced first electrical signal dependent on rotational position of said rotor relative to said stator, the said induced first electrical signal being induced in a respective one of said windings by a voltage across at least one other of said windings, said voltage being a requirement of normal operation of the machine to convert electrical energy into mechanical energy and/or mechanical energy into electrical energy, to thereby supply at least one second electrical signal to said control means representative of the rotational position of said rotor relative to said stator.

2. A machine according to claim 1, wherein said stator has a plurality of stator poles, and at least one said armature winding is wound with a pitch corresponding to a plurality of stator pole pitches.

3. A machine according to claim 1, wherein said field magnet means includes at least one field winding adapted to be connected in series or in parallel with a circuit containing at least one said armature winding.

4. A machine according to claim 3, wherein the position sensing means is adapted to detect said at least one induced first electrical signal in said at least one field winding.

5. A machine according to claim 1, wherein the position sensing means is adapted to detect when at least one said induced first electrical signal passes through at least one threshold value to produce said at least one second electrical signal.

6. A machine according to claim 5, wherein the position sensing means is adapted to detect when at least one said induced first electrical signal passes through at least one respective threshold value when at least one of said windings is energized with substantially uniform voltage and/or when at least one of said windings is not energized, said voltage being a requirement of normal operation of the machine to convert electrical energy into mechanical energy and/or mechanical energy into electrical energy.

7. A machine according to claim 5, wherein the position sensing means is adapted to determine when to begin and/or end energisation of at least one said armature winding by determining relative proportions of time for which at least one said induced first electrical signal is greater than or less than at least one respective threshold value in at least one of said windings during a predetermined period of rotation of said rotor.

8. A machine according to claim 7, wherein the position sensing means is adapted to control timing of energisation of at least one said armature winding to maintain relative proportions of time for which said at least one induced first electrical signal is greater than or less than at least one respective threshold value in at least one of said windings within predetermined limits.

9. A machine according to claim 8, wherein the predetermined limits are adapted to vary in dependence upon output performance of said machine.

10. A machine according to claim 8, wherein the position sensing means is adapted to control timing of said energisation by means of at least one error signal input to said control means.

11. A machine according to claim 8, wherein the position sensing means is adapted to selectively control timing of said energisation in response to failure to detect at least one said induced first electrical signal passing through a threshold value during a predetermined period.

12. A machine according to claim 5, wherein the position sensing means is adapted to detect when at least one said induced first electrical signal passes through at least one respective threshold value to produce at least one said second electrical signal, at least one said threshold value being a function of the corresponding said induced first electrical signal.

13. A machine according to claim 1, wherein the position sensing means is adapted to extract at least one said induced first electrical signal dependent on rotational position of said rotor relative to said stator, from the rate of change of current occurring in an electrical winding of the machine arising as a result of the existence of a voltage across at least one of said windings.

14. A machine according to claim 13, wherein the position sensing means includes at least one respective coil adapted to be magnetically coupled to a magnetic field generated by a conductor carrying current passing through at least one of said windings.

15. A machine according to claim 1, wherein the position sensing means is adapted to obtain data relating to at least one said induced first electrical signal and compare said data with data relating to at least one known rotor position.

16. A machine according to claim 1, wherein the position sensing means is adapted to provide at least one said second electrical signal representative of rotational position of the rotor at standstill by determining at least one said induced first electrical signal in at least one of said windings when at least one other of said windings is energised.

17. A machine according to claim 16, wherein the control means is adapted to cause said rotor to move relative to said stator to a position of stable equilibrium in response to at least one said second electrical signal from said position sensing means generated at standstill of said rotor.

18. A machine according to claim 17, wherein the position sensing means is adapted to indicate the nearest position of stable equilibrium of said rotor relative to said stator by observing the respective said induced first electrical signal in said at least one winding when said at least one other winding is energized.

19. A machine according to claim 1, wherein the position sensing means is adapted to monitor at least one said induced first electrical signal by intermittently sampling said signal.

20. A machine according to claim 1, wherein the position sensing means is adapted to monitor at least one said second electrical signal by intermittently sampling said signal.

21. A machine according to claim 1, wherein the position sensing means is adapted to detect the rate of change of said at least one induced first electrical signal caused by a change in the magnetic flux through said winding.

22. A method of controlling an electrical machine for converting electrical energy into mechanical energy and/or mechanical energy into electrical energy, the machine comprising a rotor having a plurality of rotor poles and a stator for rotatably receiving said rotor and having field magnet means for generating a first magnetomotive force between said rotor and said stator, the stator having at least two electrical windings at least one of which is a respective armature winding adapted to carry electrical current varying in synchronism with rotation of said rotor relative to said stator to generate a varying second magnetomotive force having a component transverse to said first magnetomotive force, the method comprising the steps of:
 detecting at least one induced first electrical signal dependent on rotational position of said rotor relative to said stator, the or each said first electrical signal being induced in a respective one of said windings by a voltage across at least one other of said windings, said voltage being a requirement of normal operation of the machine to convert electrical energy into mechanical energy and/or mechanical energy into electrical energy;
 supplying at least one second electrical signal representative of the rotational position of said rotor relative to said stator; and
 controlling supply of electrical current to the or each said armature winding in response to at least one said second electrical signal.

23. A method according to claim 22, wherein the detection of said at least one induced first electrical signal comprises detecting at least one said induced first electrical signal in at least one field winding of said field magnet means.

24. A method according to claim 22, wherein the detection of said at least one induced first electrical signal comprises detecting when at least one said induced first electrical signal passes through at least one threshold value to produce at least one said second electrical signal.

25. A method according to claim 24, wherein the detection of said at least one induced first electrical signal comprises detecting when at least one induced first electrical signal passes through at least one respective threshold value when at least one of said windings is energized with substantially uniform voltage and/or when at least one of said windings is not energized, said voltage being a requirement of normal operation of the machine to convert electrical energy into mechanical energy and/or mechanical energy into electrical energy.

26. A method according to claim 24, further comprising the step of determining when to begin and/or end energisation of at least one said armature winding by determining relative proportions of time for which at least one said induced first electrical signal is greater than or less than at least one respective threshold value in at least one of said windings during a predetermined period of rotation of said rotor.

27. A method according to claim 26, further comprising the step of controlling timing of energisation of at least one said armature winding to maintain relative proportions of time for which at least one said induced first electrical signal is greater than or less than at least one respective threshold value in at least one of said windings within predetermined limits.

28. A method according to claim 27, further comprising the step of varying said predetermined limits in dependence upon output performance of said machine.

29. A method according to claim 22, further comprising the step of controlling timing of said energisation by means of at least one error signal.

30. A method according to claim 29, further comprising the step of selectively controlling timing of said energisation in response to failure to detect at least one said induced first electrical signal passing through a threshold value during a predetermined period.

31. A method according to claim 22, wherein the detection of said at least one induced first electrical signal comprises detecting when at least one said induced first electrical signal passes through at least one respective threshold value to produce at least one said second electrical signal, at least one said threshold value being a function of an average value of the corresponding said induced first electrical signal.

32. A method according to claim 22, further comprising the step of extracting at least one said induced first electrical signal dependent on rotational position of said rotor relative to said stator, from the rate of change of current occurring in one of said windings arising as a result of the existence of a voltage across one or more other of said windings.

33. A method according to claim 22, further comprising the step of obtaining data relating to at least one said induced first electrical signal and comparing said data with data relating to at least one known rotor position.

34. A method according to claim 22, further comprising the step of providing at least one said second electrical signal representative of rotational position of said rotor at standstill by determining at least one said induced first electrical signal in at least one of said windings when at least one other of said windings is energised.

35. A method according to claim 34, further comprising the step of causing said rotor to move relative to said stator to a position of stable equilibrium in response to at least one said second electrical signal from said position sensing means generated at standstill of said rotor.

36. A method according to claim 35, further comprising the step of indicating the nearest position of stable equilibrium of said rotor relative to said stator by observing the respective said induced first electrical signal in at least one of said windings when at least one other of said windings is energized.

37. A method according to claim 22, further comprising the step of monitoring at least one said induced first electrical signal by intermittently sampling said signal.

38. A method according to claim 22, further comprising the step of monitoring at least one said second electrical signal by intermittently sampling said signal.

39. A method according to claim 22, wherein the detecting of said at least one first electrical signal dependent on rotational position of said rotor comprises detecting the rate of change of said at least one induced first electrical signal caused by a change in the magnetic flux through said winding.

40. A method of determining the rate of change of current in at least one winding of an electrical machine for converting electrical energy into mechanical energy and/or mechanical energy into electrical energy, the method comprising monitoring a voltage induced in at least one respective coil magnetically coupled to a magnetic field generated by a conductor carrying said current.

* * * * *